(12) United States Patent
Čierny et al.

(10) Patent No.: US 12,619,123 B2
(45) Date of Patent: May 5, 2026

(54) OPTICAL PHASED ARRAY WAVEFRONT SENSING AND CONTROL

(71) Applicant: TAARA CONNECT, INC., Sunnyvale, CA (US)

(72) Inventors: Ondrej Čierny, Mountain View, CA (US); Jean-Laurent Plateau, San Jose, CA (US)

(73) Assignee: Taara Connect, Inc., Sunnyvale, CA (US)

( * ) Notice: Subject to any disclaimer, the term of this patent is extended or adjusted under 35 U.S.C. 154(b) by 338 days.

(21) Appl. No.: 18/236,686

(22) Filed: Aug. 22, 2023

(65) Prior Publication Data

US 2024/0385492 A1 Nov. 21, 2024

Related U.S. Application Data

(63) Continuation-in-part of application No. 18/298,532, filed on Apr. 11, 2023.

(60) Provisional application No. 63/431,787, filed on Dec. 12, 2022.

(51) Int. Cl.
| | |
|---|---|
| *G02F 1/29* | (2006.01) |
| *H04B 10/548* | (2013.01) |
| *G02B 27/00* | (2006.01) |

(52) U.S. Cl.
CPC ........... *G02F 1/292* (2013.01); *H04B 10/548* (2013.01); *G02B 27/0087* (2013.01)

(58) Field of Classification Search
None
See application file for complete search history.

(56) References Cited

U.S. PATENT DOCUMENTS

| | | | |
|---|---|---|---|
| 6,708,003 | B1 | 3/2004 | Wickham et al. |
| 8,041,161 | B1 | 10/2011 | Collier et al. |
| 8,594,511 | B2 | 11/2013 | Smith et al. |
| 8,730,095 | B1 | 5/2014 | Volman et al. |
| 10,241,326 | B2 | 3/2019 | Wang |
| 10,374,663 | B2 | 8/2019 | Jackson et al. |
| 11,139,907 | B2 | 10/2021 | Melikyan et al. |
| 11,249,370 | B2 | 2/2022 | Hajimiri |

(Continued)

OTHER PUBLICATIONS

Pearson , et al., "Coherent Optical Adaptive Techniques: Design and Performance of an 18-element Visible Multidither COAT System", Applied Optics, 1976, vol. 15., No. 3, pp. 611-621.

(Continued)

*Primary Examiner* — David W Lambert
(74) *Attorney, Agent, or Firm* — Botos Churchill IP Law LLP

(57) ABSTRACT

Aspects of the disclosure provide a method of adjusting a plurality of phase shifters of an OPA. The method may include identifying a plurality of subsets of phase shifters of the plurality of phase shifters based on an orthogonal set of functions; performing a plurality of dithers iteratively on the plurality of subsets of phase shifters of the plurality of phase shifters using the same frequency; determining a plurality of corrections based on a plurality of outputs of the OPA, each output resulting from each of the plurality of dithers; and adjusting the plurality of subsets of phase shifters of the plurality of phase shifters using the plurality of corrections, the adjustment resulting in at least one set of corrected phase shifter values.

20 Claims, 14 Drawing Sheets

(56) References Cited

U.S. PATENT DOCUMENTS

| | | | |
|---|---|---|---|
| 2009/0142073 A1* | 6/2009 | Smith | .................... H04B 10/50 |
| | | | 398/192 |
| 2011/0176565 A1 | 7/2011 | Hutchin | |
| 2016/0139266 A1 | 5/2016 | Montoya et al. | |

OTHER PUBLICATIONS

Pearson , et al., "Multidither Adaptive Algorithms", Contract F30602-76-C-0022, Hughes Research Laboratories, 1976, 62 pages.

Wang , "Control of Deformable Mirror With Light-intensity Measurements Through Single-mode Fiber", Applied Optics, vol. 49, No. 31, 2010, pp. G60-G66.

Wang , "Wavefront Sensing Through Measurements of Binary Aberration Modes", Applied Optics, vol. 48, No. 15, 2009, pp. 2865-2870.

Zhang , et al., "Method for 10 Gbps Near-ground Quasi-static Free-space Laser Transmission by Nutation Mutual 5 Coupling", Optics Express, vol. 30, No. 19, pp. 33465-33478, Sep. 12, 2022.

International Search Report and Written Opinion for corresponding Application No. PCT/US2023/029835 dated Nov. 2, 2023 (12 pages).

International Search Report and Written Opinion for corresponding International Application No. PCT/US2023/082507 dated Mar. 15, 2024 21 pages).

* cited by examiner

100

200

400

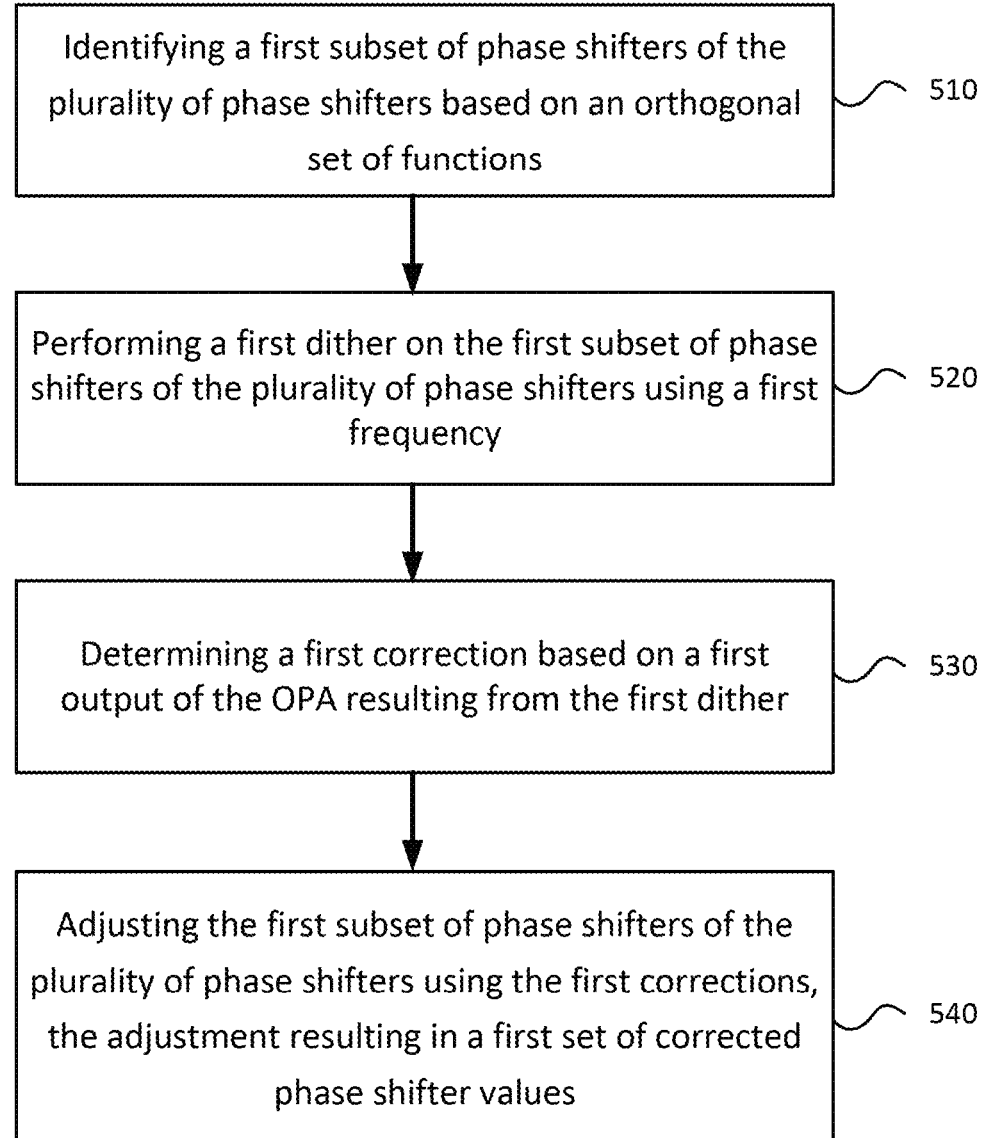

Identifying a first subset of phase shifters of the plurality of phase shifters based on an orthogonal set of functions ⟞ 510

Performing a first dither on the first subset of phase shifters of the plurality of phase shifters using a first frequency ⟞ 520

Determining a first correction based on a first output of the OPA resulting from the first dither ⟞ 530

Adjusting the first subset of phase shifters of the plurality of phase shifters using the first corrections, the adjustment resulting in a first set of corrected phase shifter values ⟞ 540

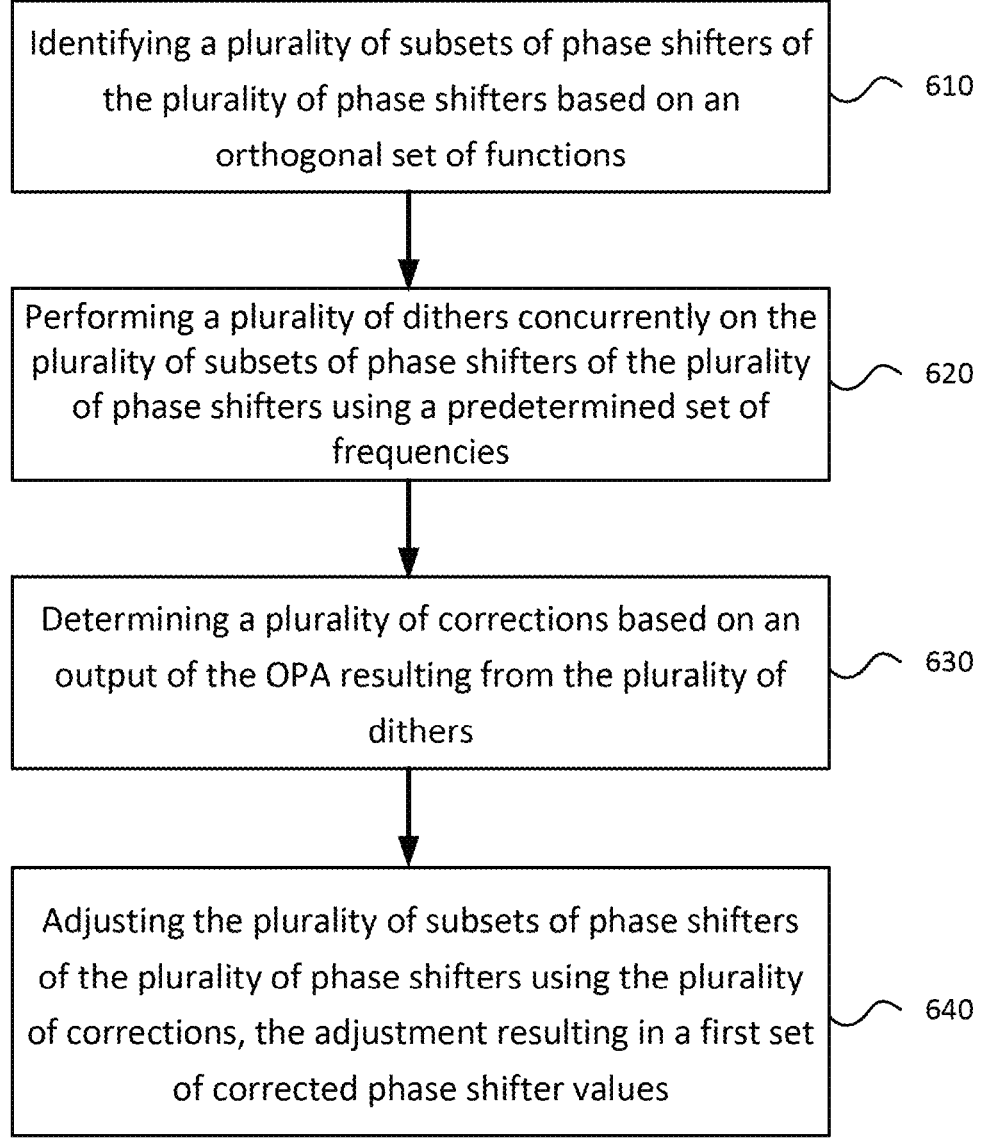

Identifying a plurality of subsets of phase shifters of the plurality of phase shifters based on an orthogonal set of functions        610

Performing a plurality of dithers concurrently on the plurality of subsets of phase shifters of the plurality of phase shifters using a predetermined set of frequencies        620

Determining a plurality of corrections based on an output of the OPA resulting from the plurality of dithers        630

Adjusting the plurality of subsets of phase shifters of the plurality of phase shifters using the plurality of corrections, the adjustment resulting in a first set of corrected phase shifter values        640

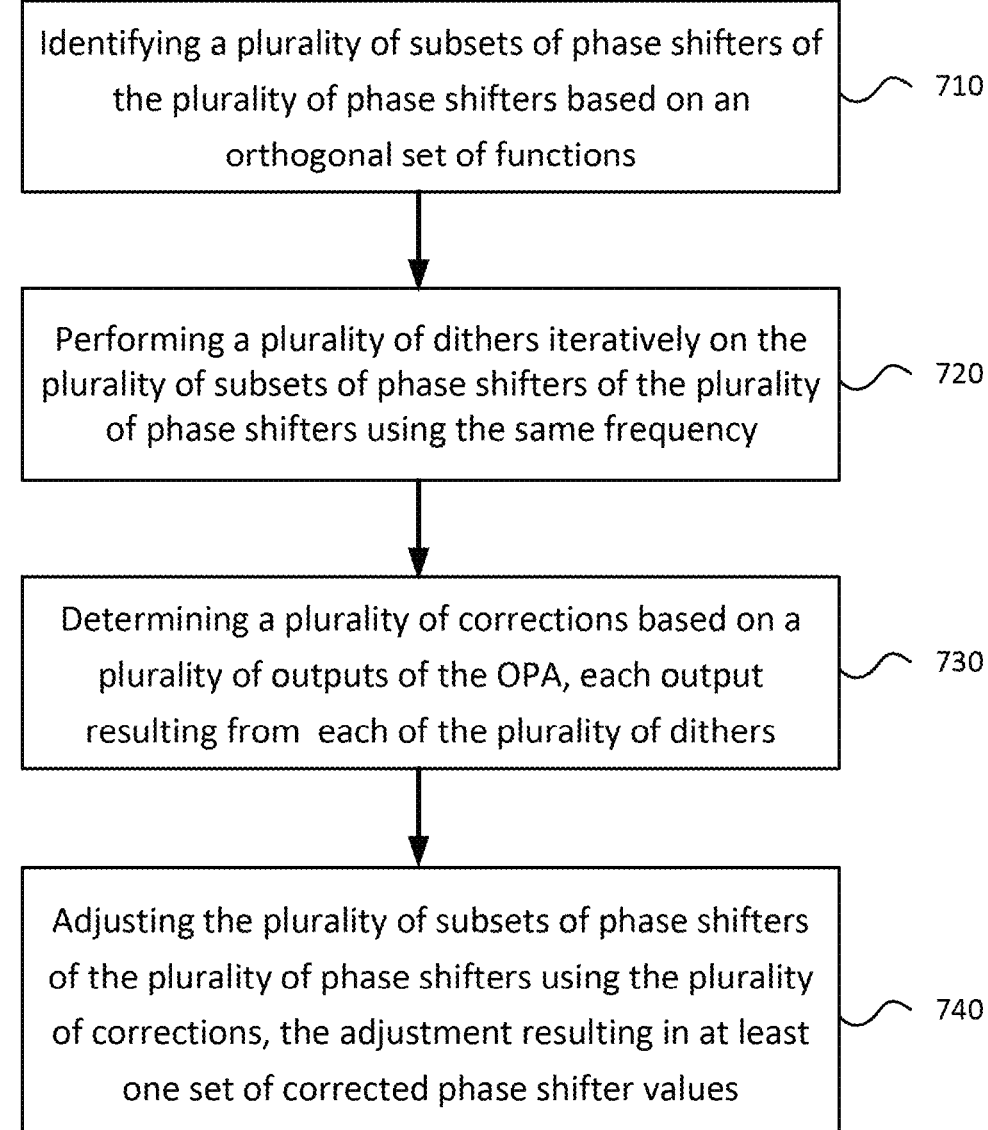

Identifying a plurality of subsets of phase shifters of the plurality of phase shifters based on an orthogonal set of functions        710

Performing a plurality of dithers iteratively on the plurality of subsets of phase shifters of the plurality of phase shifters using the same frequency        720

Determining a plurality of corrections based on a plurality of outputs of the OPA, each output resulting from each of the plurality of dithers        730

Adjusting the plurality of subsets of phase shifters of the plurality of phase shifters using the plurality of corrections, the adjustment resulting in at least one set of corrected phase shifter values        740

Figure 10:
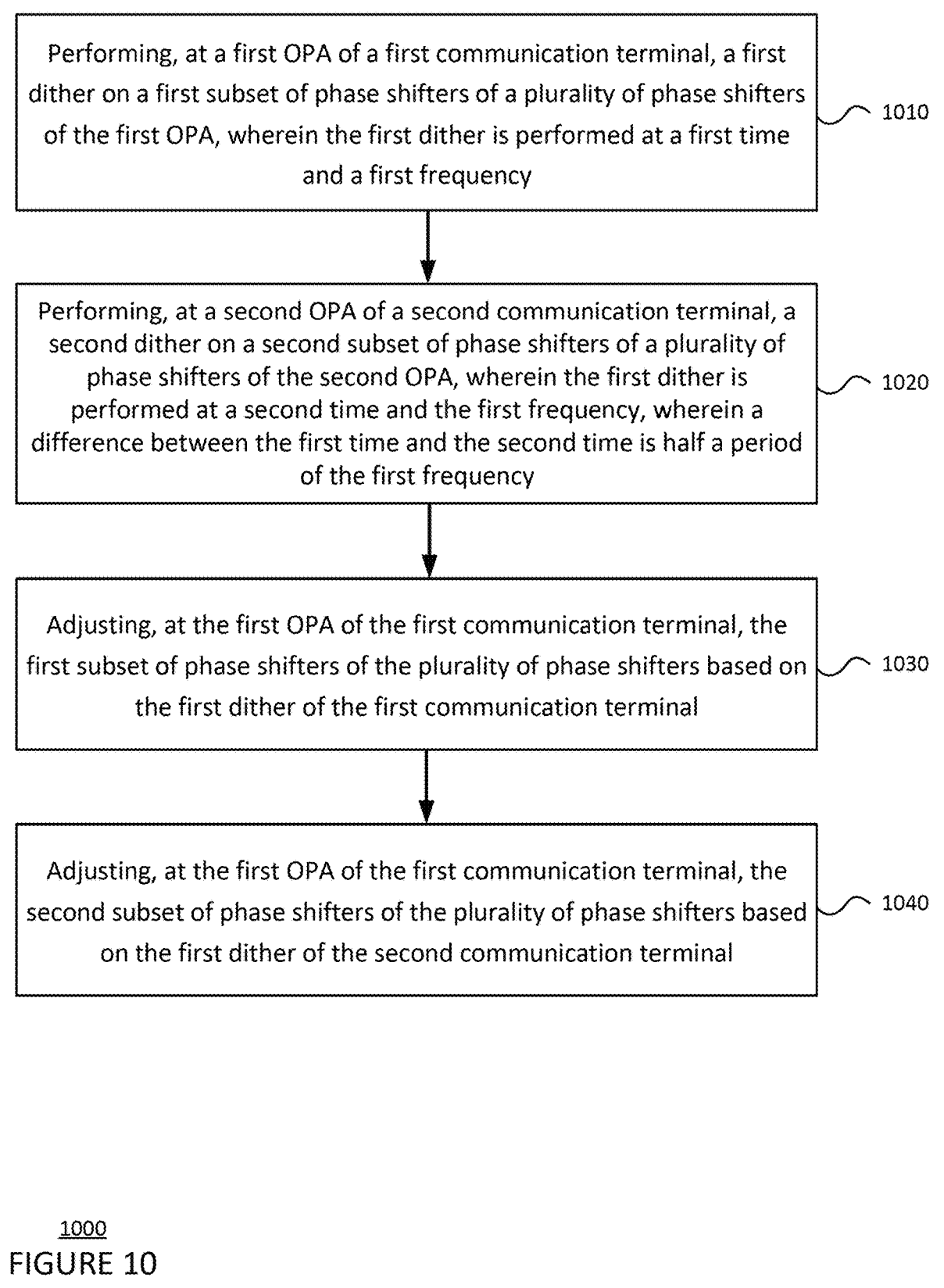

Performing, at a first OPA of a first communication terminal, a first dither on a first subset of phase shifters of a plurality of phase shifters of the first OPA, wherein the first dither is performed at a first time and a first frequency     1010

Performing, at a second OPA of a second communication terminal, a second dither on a second subset of phase shifters of a plurality of phase shifters of the second OPA, wherein the first dither is performed at a second time and the first frequency, wherein a difference between the first time and the second time is half a period of the first frequency     1020

Adjusting, at the first OPA of the first communication terminal, the first subset of phase shifters of the plurality of phase shifters based on the first dither of the first communication terminal     1030

Adjusting, at the first OPA of the first communication terminal, the second subset of phase shifters of the plurality of phase shifters based on the first dither of the second communication terminal     1040

Figure 11:
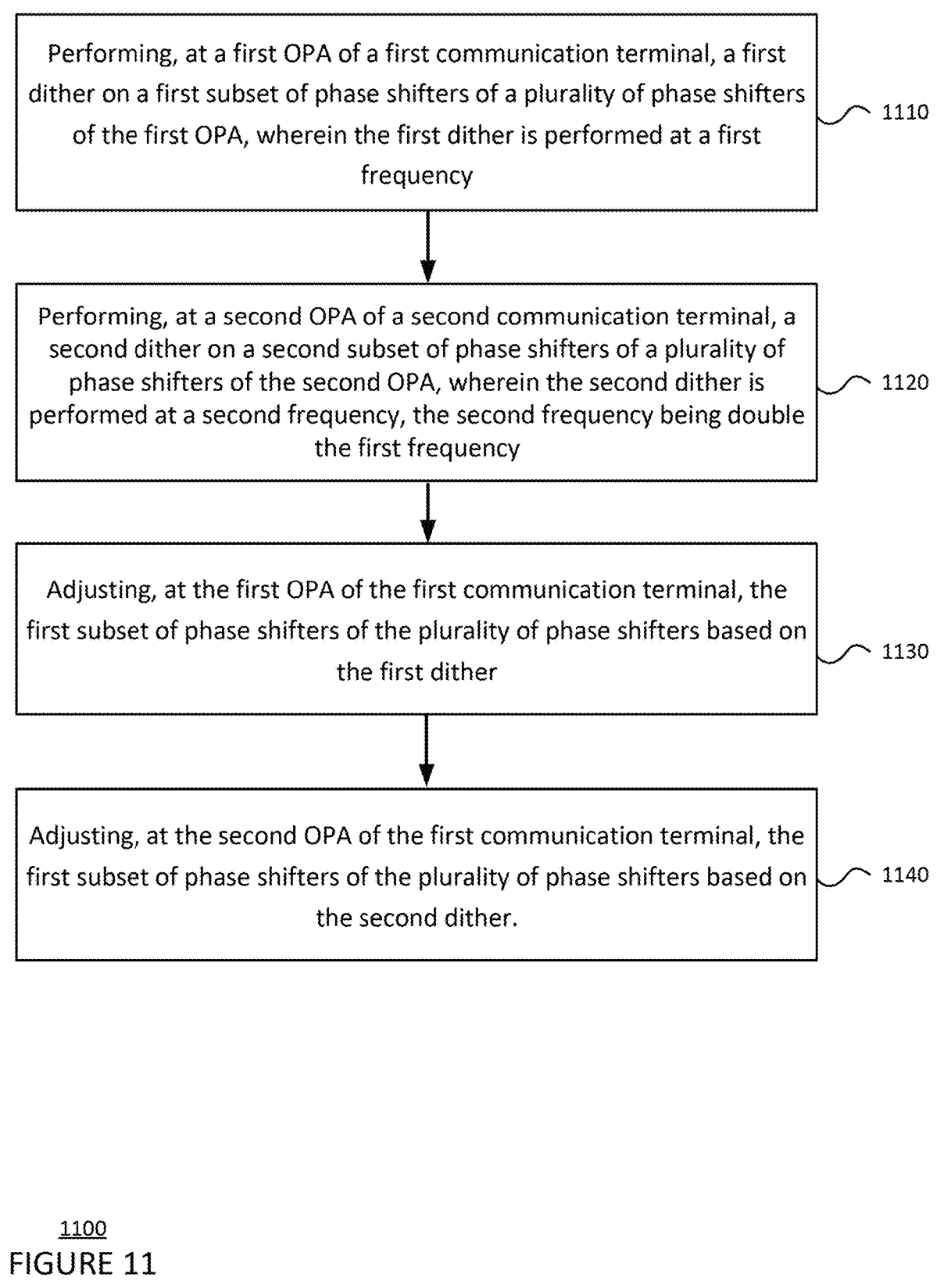

```
┌─────────────────────────────────────────────────────────────┐
│  Performing, at a first OPA of a first communication          │
│  terminal, a first dither on a first subset of phase shifters │  ~ 1110
│  of a plurality of phase shifters of the first OPA, wherein   │
│  the first dither is performed at a first frequency           │
└─────────────────────────────────────────────────────────────┘
                              │
                              ▼
┌─────────────────────────────────────────────────────────────┐
│  Performing, at a second OPA of a second communication        │
│  terminal, a second dither on a second subset of phase        │
│  shifters of a plurality of phase shifters of the second OPA, │  ~ 1120
│  wherein the second dither is performed at a second           │
│  frequency, the second frequency being double the first       │
│  frequency                                                    │
└─────────────────────────────────────────────────────────────┘
                              │
                              ▼
┌─────────────────────────────────────────────────────────────┐
│  Adjusting, at the first OPA of the first communication       │
│  terminal, the first subset of phase shifters of the          │  ~ 1130
│  plurality of phase shifters based on the first dither        │
└─────────────────────────────────────────────────────────────┘
                              │
                              ▼
┌─────────────────────────────────────────────────────────────┐
│  Adjusting, at the second OPA of the first communication      │
│  terminal, the first subset of phase shifters of the          │  ~ 1140
│  plurality of phase shifters based on the second dither.      │
└─────────────────────────────────────────────────────────────┘
```

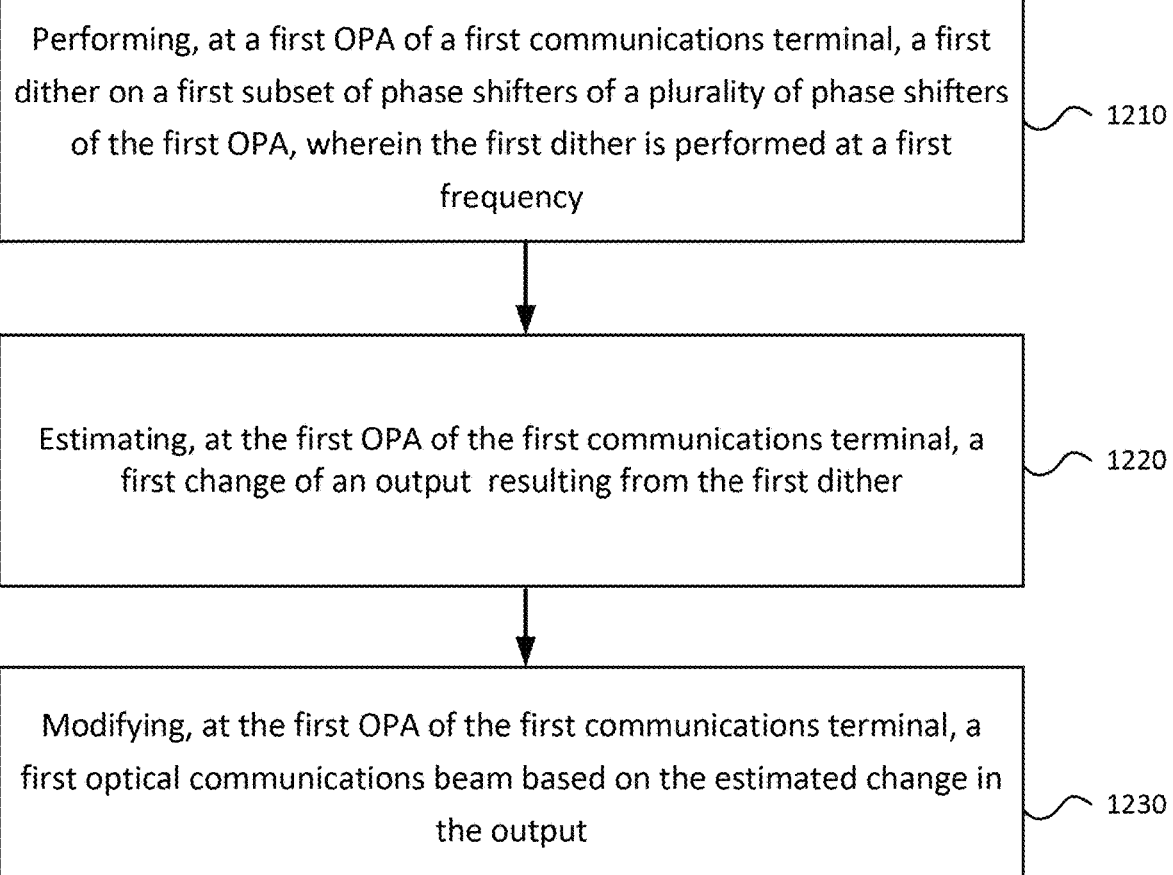

Performing, at a first OPA of a first communications terminal, a first dither on a first subset of phase shifters of a plurality of phase shifters of the first OPA, wherein the first dither is performed at a first frequency     1210

Estimating, at the first OPA of the first communications terminal, a first change of an output resulting from the first dither     1220

Modifying, at the first OPA of the first communications terminal, a first optical communications beam based on the estimated change in the output     1230

Figure 13:
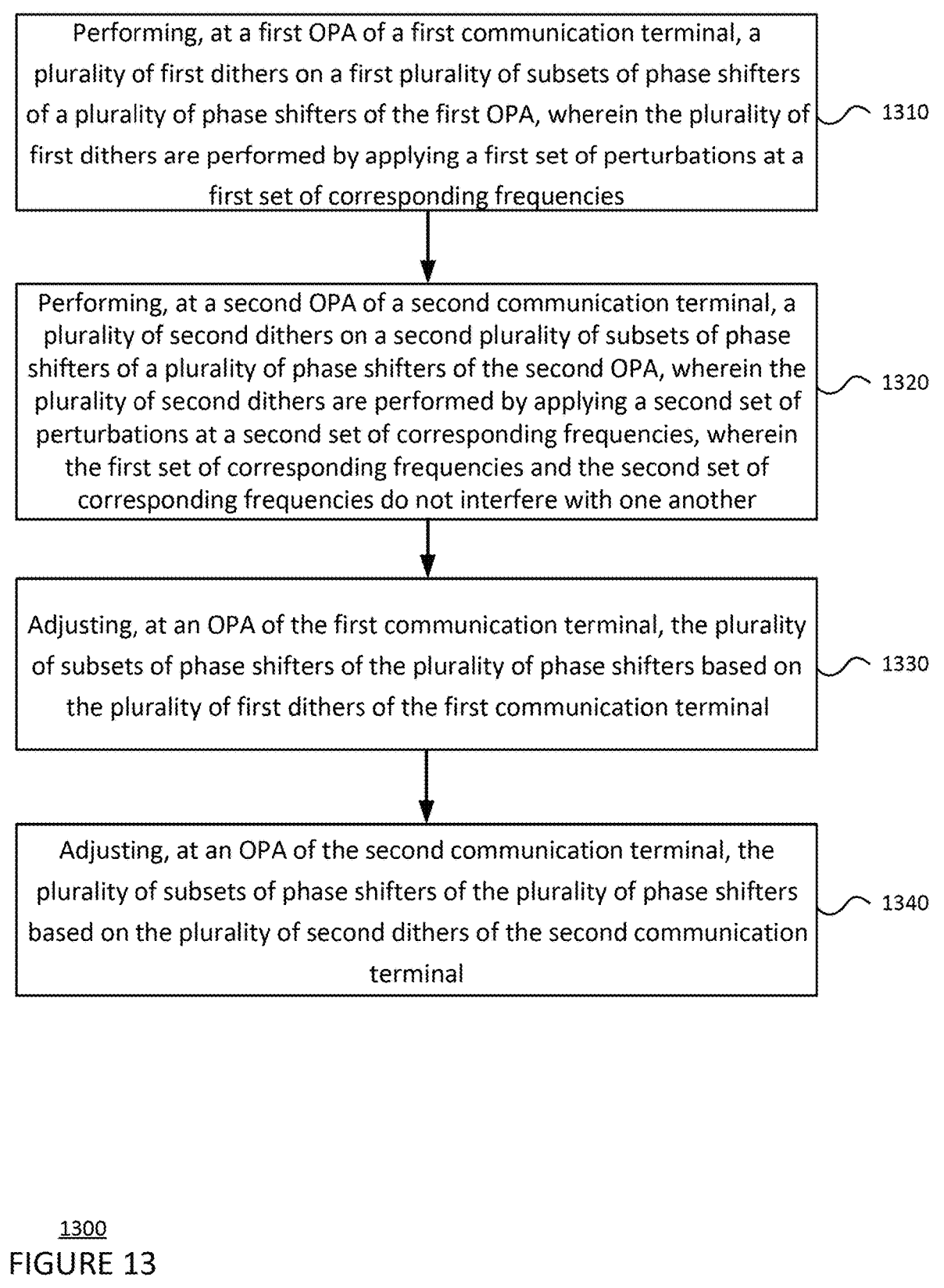

Performing, at a first OPA of a first communication terminal, a plurality of first dithers on a first plurality of subsets of phase shifters of a plurality of phase shifters of the first OPA, wherein the plurality of first dithers are performed by applying a first set of perturbations at a first set of corresponding frequencies ⟶ 1310

Performing, at a second OPA of a second communication terminal, a plurality of second dithers on a second plurality of subsets of phase shifters of a plurality of phase shifters of the second OPA, wherein the plurality of second dithers are performed by applying a second set of perturbations at a second set of corresponding frequencies, wherein the first set of corresponding frequencies and the second set of corresponding frequencies do not interfere with one another ⟶ 1320

Adjusting, at an OPA of the first communication terminal, the plurality of subsets of phase shifters of the plurality of phase shifters based on the plurality of first dithers of the first communication terminal ⟶ 1330

Adjusting, at an OPA of the second communication terminal, the plurality of subsets of phase shifters of the plurality of phase shifters based on the plurality of second dithers of the second communication terminal ⟶ 1340

Figure 14:
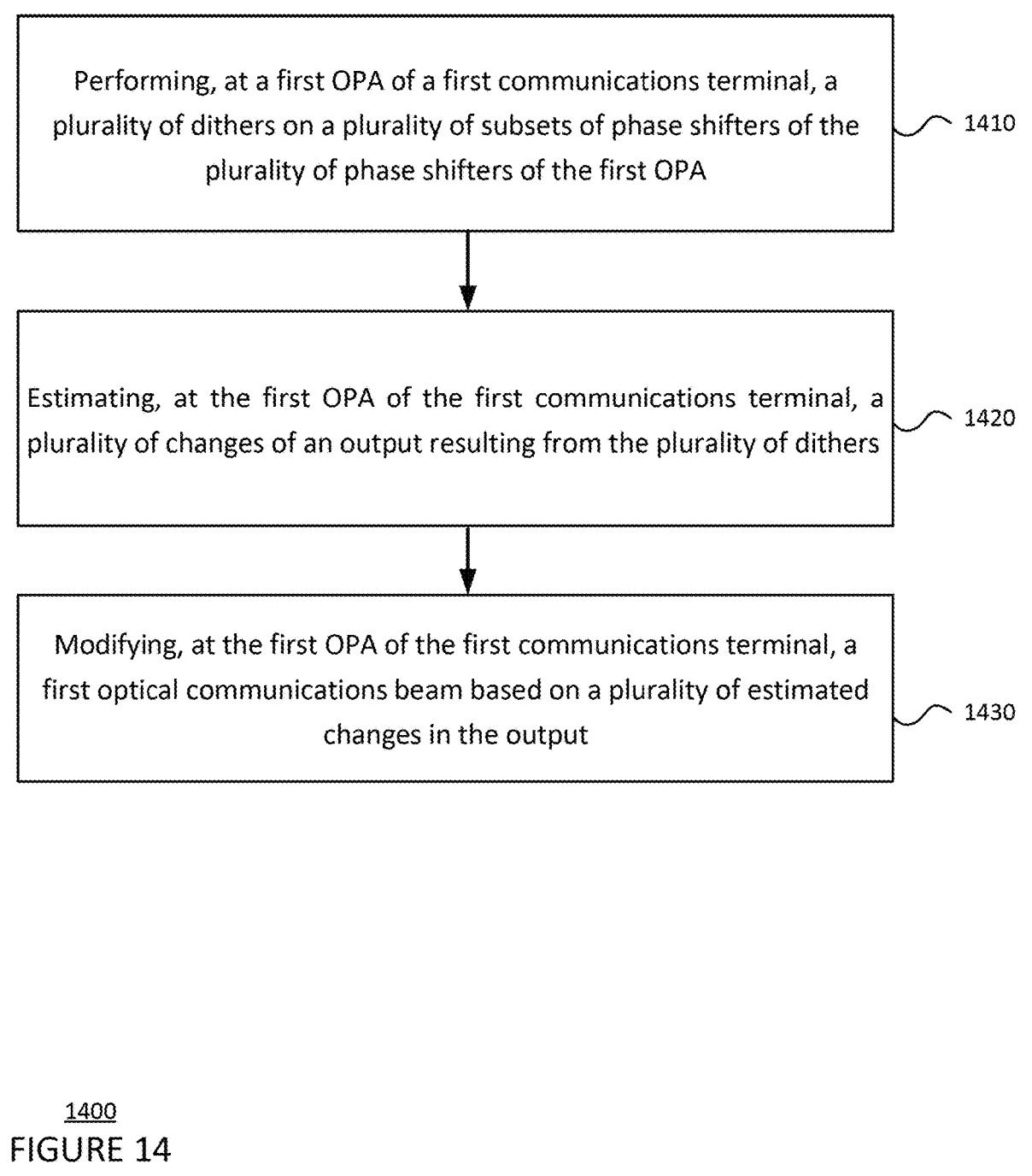

Performing, at a first OPA of a first communications terminal, a plurality of dithers on a plurality of subsets of phase shifters of the plurality of phase shifters of the first OPA       $\curvearrowright$ 1410

Estimating, at the first OPA of the first communications terminal, a plurality of changes of an output resulting from the plurality of dithers       $\curvearrowright$ 1420

Modifying, at the first OPA of the first communications terminal, a first optical communications beam based on a plurality of estimated changes in the output       $\curvearrowright$ 1430

OPTICAL PHASED ARRAY WAVEFRONT SENSING AND CONTROL

CROSS-REFERENCE TO RELATED APPLICATIONS

This application is a continuation in part of U.S. patent application Ser. No. 18/298,532, filed Apr. 11, 2023, which claims the benefit of the filing date and priority to U.S. Provisional Patent Application No. 63/431,787, filed Dec. 12, 2022, the entire disclosures of which are incorporated herein by reference.

BACKGROUND

Wireless optical communication enables high-throughput and long-range communication, in part due to high gain offered by the narrow angular width of the transmitted beam. However, the narrow beam also requires that it must be accurately and actively pointed in order to remain aligned to an aperture of a communications terminal at the remote end. This pointing may be accomplished by small mirrors (e.g., MEMS or voice-coil based fast-steering mirror mechanisms) that are actuated to steer the beam. In other implementations, electro-optic steering of beams with no moving parts is used to steer the beam, which provides cost, lifetime and performance advantages. Optical Phased Arrays (OPAs) are a critical technology component, with added benefits of adaptive-optics, point-to-multipoint support, and mesh network topologies. Each active element in the OPA requires electro-optic phase shifting capability.

BRIEF SUMMARY

Aspects of the disclosure relate to a method of adjusting a plurality of phase shifters of an OPA. The method comprising identifying a plurality of subsets of phase shifters of the plurality of phase shifters based on an orthogonal set of functions; performing a plurality of dithers iteratively on the plurality of subsets of phase shifters of the plurality of phase shifters using the same frequency: determining a plurality of corrections based on a plurality of outputs of the OPA, each output resulting from each of the plurality of dithers; and adjusting the plurality of subsets of phase shifters of the plurality of phase shifters using the plurality of corrections, the adjustment resulting in at least one set of corrected phase shifter values.

In one example, identifying the plurality of subsets of phase shifters of the plurality of phase shifters based on the orthogonal set of functions includes identifying a first subset of phase shifters of the plurality of phase shifters based on the orthogonal set of functions; and identifying a second subset of phase shifters of the plurality of phase shifters based on the orthogonal set of functions. In a further example, performing the plurality of dithers iteratively on the plurality of subsets of phase shifters of the plurality of phase shifters using the same frequency includes: performing a first dither on the first subset of phase shifters of the plurality of phase shifters at a first time; and performing a second dither on the second subset of phase shifters of the plurality of phase shifters at a second time following the first time. In a further example, the first dither is performed by applying a first perturbation; and the second dither is performed by applying a second perturbation. In an additional example, the first perturbation and second perturbations are (1) sine functions or (2) cosine functions. In another example, the first perturbation is a sine function and the second perturbation is a cosine function.

In a further example, determining the plurality of corrections based on the plurality of outputs of the OPA includes determining a plurality of changes in phase.

In another example, the plurality of phase shifters are arranged in a circle; and the orthogonal set of functions is a set of circular functions.

In an additional example, the plurality of outputs are a plurality of transmitted optical communications beams.

In a further example, the frequency is a terminal frequency unique to an optical communications terminal containing the OPA.

In another example, the frequency is an OPA frequency unique to the OPA.

Another aspect of the disclosure relates to a system of optical communications terminals configured to transmit and receive optical communications beams. The system comprising a first optical communications terminal comprising an OPA configured to transmit and receive one or more optical communications beams, the OPA comprising a plurality of phase shifters, and one or more processors configured to perform a plurality of dithers iteratively on a plurality of subsets of phase shifters of the plurality of phase shifters using a first terminal frequency; and a second optical communications terminal comprising an OPA configured to transmit and receive one or more optical communications beams, the OPA comprising a plurality of phase shifters, and one or more processors configured to perform a plurality of dithers iteratively on a plurality of subsets of phase shifters of the plurality of phase shifters using a second terminal frequency.

In one example, the one or more processors of the first optical communications terminal are further configured to identify the plurality of subsets of phase shifters of the plurality of phase shifters based on an orthogonal set of functions: determine a plurality of corrections based on a plurality of outputs of the OPA, each output resulting from each of the plurality of dithers; and adjust the plurality of subsets of phase shifters of the plurality of phase shifters using the plurality of corrections, the adjustment resulting in at least one set of corrected phase shifter values.

In an additional example, the first terminal frequency and the second terminal frequency are unique frequencies.

In another example, the plurality of phase shifters are arranged in a circle.

Another aspect of the disclosure relates to a method of adjusting a plurality of phase shifters of a plurality of OPAs of a communication system. The method comprising performing, at a first OPA of a first optical communications terminal a first dither on a first subset of phase shifters of a plurality of phase shifters of the first OPA, wherein the first dither is performed at a first frequency; performing, at a second OPA of a second optical communications terminal, a second dither on a second subset of phase shifters of a plurality of phase shifters of the second OPA, wherein the second dither is performed at a second frequency; adjusting, at the first OPA of the first optical communications terminal, the first subset of phase shifters of the plurality of phase shifters based on the first dither of the first optical communications terminal; and adjusting, at the first OPA of the second optical communications terminal, the second subset of phase shifters of the plurality of phase shifters based on the second dither of the second optical communications terminal.

In one example, the first frequency is a first terminal frequency and the second frequency is a second terminal frequency.

In another example, the first frequency and the second frequency do not interfere.

In a further example, the first dither and second dither are not coordinated.

In an additional example performing, at the first OPA of the first optical communications terminal, the first dither on the first subset of phase shifters of the plurality of phase shifters of the first OPA includes applying, at the first OPA of the first optical communications terminal, a first perturbation at the first frequency to a wavefront at the first subset of the phase shifters; and adjusting, at the first OPA of the first optical communications terminal, an initial set of phase shifter values of the first subset of phase shifters based on the first perturbation, the adjustment resulting in a first set of phase shifter values. In a further example, the method further includes determining, at the first OPA of the first optical communications terminal, a first correction based on a first power output of the first OPA resulting from the first dither: wherein adjusting, at the first OPA of the first optical communications terminal, the first subset of phase shifters of the plurality of phase shifters is based on the first correction.

BRIEF DESCRIPTION OF THE DRAWINGS

FIG. 5 is a flow diagram in accordance with aspects of the disclosure.

FIG. 6 is a flow diagram in accordance with aspects of the disclosure.

FIG. 7 is a flow diagram in accordance with aspects of the disclosure

FIG. 10 is a flow diagram in accordance with aspects of the disclosure.

FIG. 11 is a flow diagram in accordance with aspects of the disclosure.

FIG. 12 is a flow diagram in accordance with aspects of the disclosure.

FIG. 13 is a flow diagram in accordance with aspects of the disclosure.

FIG. 14 is a flow diagram in accordance with aspects of the disclosure.

DETAILED DESCRIPTION

Overview

The technology relates to an optical phased array (OPA) architecture that performs wavefront sensing and corrects for error in a larger communication system. The OPA architecture may involve the use of an OPA chip with a photonic integrated circuit (PIC) of an optical communications terminal. The OPA architecture may include a plurality of phase shifters and a plurality of array elements. The plurality of phase shifters may be arranged in an array. The array may be a 2-D array of, for example, N×N or N×M phase shifters or another configuration arranged on a grid. Each phase shifter of the plurality may be configured to shift a respective portion of an optical communications beam or signal incrementally to amass a total phase shift for each of the plurality of array elements. As a result, transmit (Tx) and receive (Rx) signals may be altered to improve signal strength and steering, and wavefront detection.

The total phase shift may be affected by one or more static and/or dynamic variables such as, for example, path length mismatch, optical aberrations, atmospheric turbulence, and platform jitter. The effect of one or more static and/or dynamic variables on the phase shift may result in a reduction of the power and/or intensity of an optical communications beam. To address this, the output of the plurality of phase shifters may be optimized in order to maximize the coherently combined signal out of the optical phased array (OPA) by using the output signal intensity as a feedback mechanism. However, because the optimal phase shifts in such a communication can vary quickly over time (e.g., due to atmospheric turbulence when communicating across larger distances), optimizing a plurality of elements individually is not feasible/quick enough.

To remedy the effects of the one or more static and/or dynamic variables and increase the power and/or intensity of an optical communications beam, a wavefront sensing and control approach using dithering, or injecting some small amount of noise (e.g., perturbation), at groups or subsets of a plurality of phase shifters at once may be used. This may involve frequency-division (FD) mode dithering, time-division (TD) mode dithering, and/or hybrid TD-FD mode dithering. The FD, TD, and hybrid TD-FD mode dithering may include use of an orthogonal set of functions. Additionally, the FD and TD mode dithering approaches may include synchronized or pre-compensated dithering methods advantageous for use in bidirectional communication.

Example Systems

Figure 1:
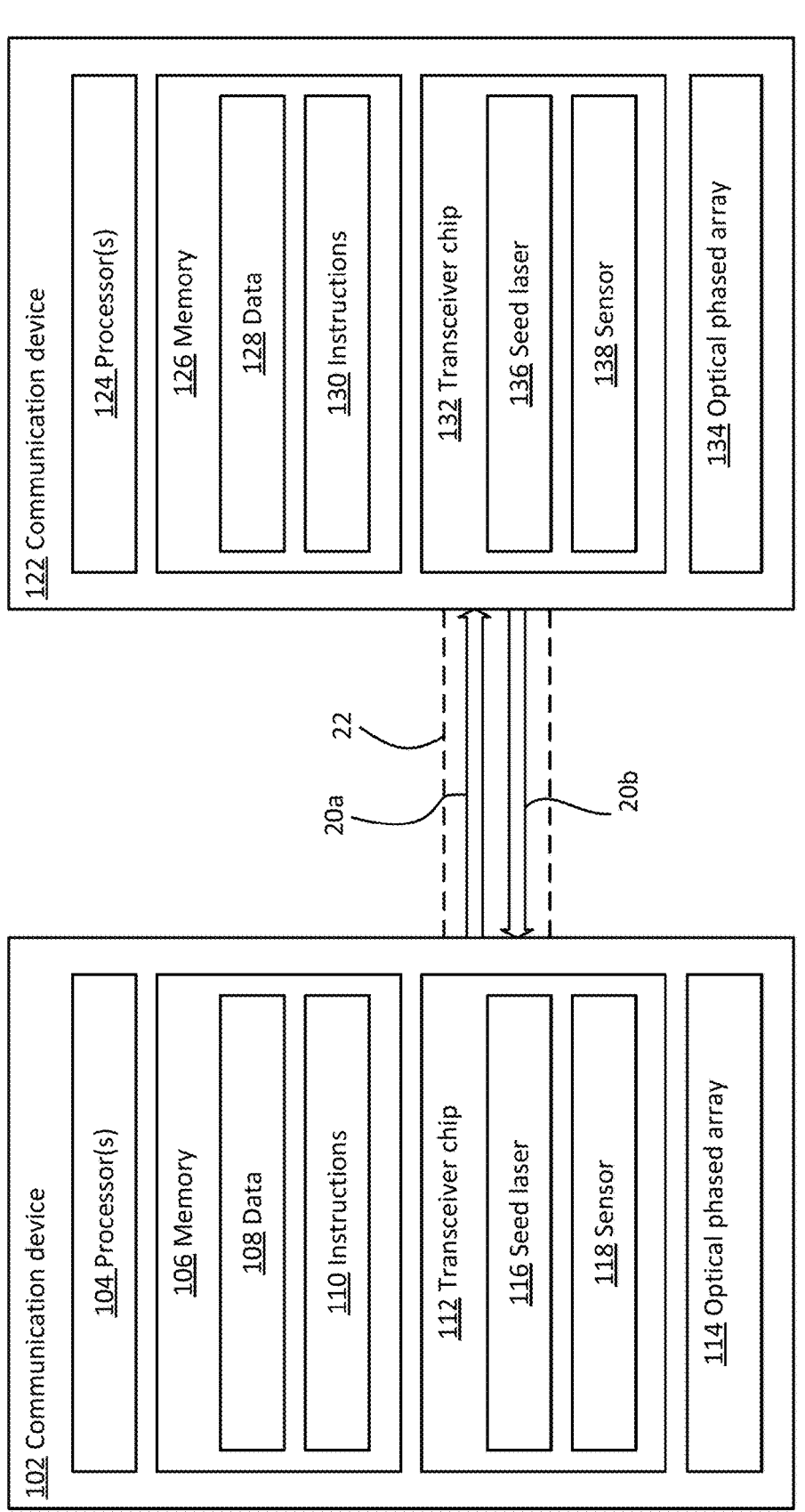
FIG. 1 is a block diagram 100 of a first communications terminal and a second communications terminal in accordance with aspects of the disclosure.
Figure 2:
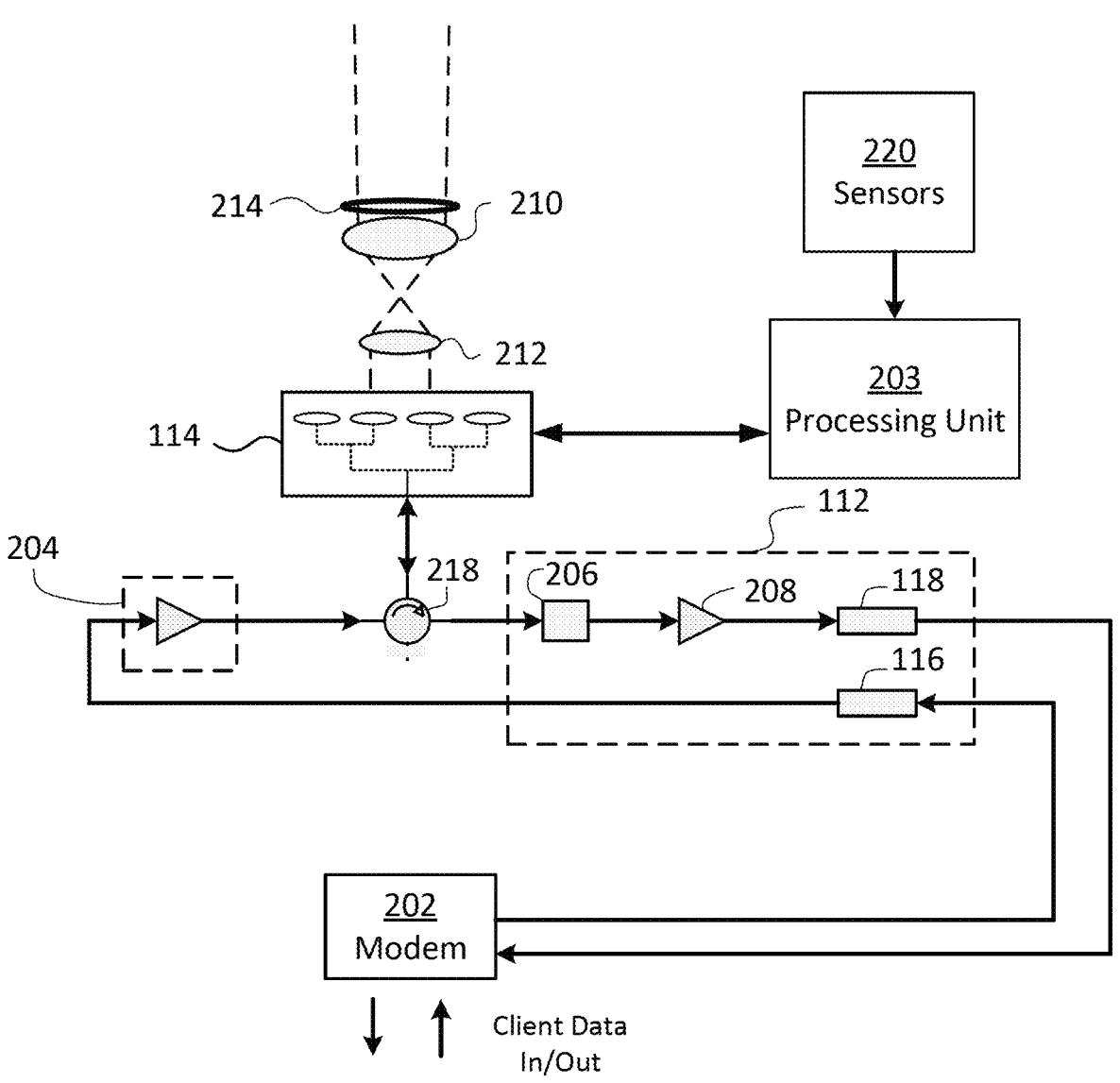
FIG. 2 is a pictorial diagram 200 of an example system architecture for the first communication device of FIG. 1 in accordance with aspects of the disclosure.

FIG. 1 is a block diagram 100 of a first communications terminal configured to form one or more links with a second communications terminal, for instance as part of a system such as a free-space optical communication (FSOC) system. FIG. 2 is a pictorial diagram 200 of an example communications terminal, such as the first communications terminal of FIG. 1. For example, a first communications terminal 102 includes one or more processors 104, a memory 106, a transceiver photonic integrated chip 112, and an optical phased array (OPA) architecture 114. In some implementations, the first communications terminal 102 may include more than one transceiver chip and/or more than one OPA architecture (e.g., more than one OPA chip).

The one or more processors 104 may be any conventional processors, such as commercially available CPUs. Alternatively, the one or more processors may be a dedicated device such as an application specific integrated circuit (ASIC) or another hardware-based processor, such as a field programmable gate array (FPGA). Although FIG. 1 functionally illustrates the one or more processors 104 and memory 106 as being within the same block, such as in a modem 202 for digital signal processing shown in FIG. 2, the one or more processors 104 and memory 106 may actually comprise multiple processors and memories that may or may not be stored within the same physical housing, such as in both the modem 202 and a separate processing unit 203. Accordingly, references to a processor or computer will be understood to include references to a collection of processors or computers or memories that may or may not operate in parallel.

Memory 106 may store information accessible by the one or more processors 104, including data 108, and instructions 110, that may be executed by the one or more processors 104. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the data 108 and instructions 110 are stored on different types of media. In the memory of each communications terminal, such as memory 106, calibration information, such as one or more offsets determined for tracking a signal, may be stored.

Data 108 may be retrieved, stored or modified by one or more processors 104 in accordance with the instructions 110. For instance, although the system and method are not limited by any particular data structure, the data 108 may be stored in computer registers, in a relational database as a table having a plurality of different fields and records, XML documents or flat files. The data 108 may also be formatted in any computer-readable format such as, but not limited to, binary values or Unicode. By further way of example only, image data may be stored as bitmaps including of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 108 may comprise any information sufficient to identify the relevant information, such as numbers, descriptive text, proprietary codes, references to data stored in other areas of the same memory or different memories (including other network locations) or information that is used by a function to calculate the relevant data.

The instructions 110 may be any set of instructions to be executed directly (such as machine code) or indirectly (such as scripts) by the one or more processors 104. For example, the instructions 110 may be stored as computer code on the computer-readable medium. In that regard, the terms "instructions" and "programs" may be used interchangeably herein. The instructions 110 may be stored in object code format for direct processing by the one or more processors 104, or in any other computer language including scripts or collections of independent source code modules that are interpreted on demand or compiled in advance. Functions, methods and routines of the instructions 110 are explained in more detail below.

The one or more processors 104 may be in communication with the transceiver chip 112. As shown in FIG. 2, the one or more processors in the modem 202 may be in communication with the transceiver chip 112, being configured to receive and process incoming optical signals and to transmit optical signals. The transceiver chip 112 may include one or more transmitter components and one or more receiver components. The one or more processors 104 may therefore be configured to transmit, via the transmitter components, data in a signal, and also may be configured to receive, via the receiver components, communications and data in a signal. The received signal may be processed by the one or more processors 104 to extract the communications and data.

The transmitter components may include at minimum a light source, such as seed laser 116. Other transmitter components may include an amplifier, such as a high-power semiconductor optical amplifier 204. In some implementations, the amplifier is on a separate photonics chip. The seed laser 116 may be a distributed feedback laser (DFB), a laser diode, a fiber laser, or a solid-state laser. The light output of the seed laser 116, or optical signal, may be controlled by a current, or electrical signal, applied directly to the seed laser, such as from a modulator that modulates a received electrical signal. Light transmitted from the seed laser 116 is received by the OPA architecture 114.

The receiver components may include at minimum a sensor 118, such as a photodiode. The sensor may convert a received signal (e.g., light or optical communications beam), into an electrical signal that can be processed by the one or more processors. Other receiver components may include an attenuator, such as a variable optical attenuator 206, an amplifier, such as a semiconductor optical amplifier 208, or a filter.

The one or more processors 104 may be in communication with the OPA architecture 114. The OPA architecture may include a micro-lens array, an emitter associated with each micro-lens in the array, a plurality of phase shifters, and waveguides that connect the components in the OPA. The OPA architecture may be positioned on a single chip, an OPA chip. The waveguides progressively merge between a plurality of emitters and an edge coupler that connect to other transmitter and/or receiver components. In this regard, the waveguides may direct light between photodetectors or fiber outside of the OPA architecture, the phase shifters the waveguide combiners, the emitters and any additional component within the OPA. In particular, the waveguide configuration may combine two waveguides at each stage, which means the number of waveguides is reduced by a factor of two at every successive stage closer to the edge coupler. The point of combination may be a node, and a combiner may be at each node. The combiner may be a 2×2 multimode interference (MMI) or directional coupler.

The OPA architecture 114 may receive light from the transmitter components and outputs the light as a coherent communications beam to be received by a remote communications terminal, such as second communications terminal 122. The OPA architecture 114 may also receive light from free space, such as a communications beam from second communications terminal 122, and provides such received light to the receiver components. The OPA architecture may provide the necessary photonic processing to combine an incoming optical communications beam into a single-mode waveguide that directs the beam towards the transceiver chip 112. In some implementations, the OPA architecture may also generate and provide an angle of arrival estimate to the one or more processors 104, such as those in processing unit 203.

The first communications terminal 102 may include additional components to support functions of the communications terminal. For example, the first communications terminal may include one or more lenses and/or mirrors that form a telescope. The telescope may receive collimated light and output collimated light. The telescope may include an objective portion, an eyepiece portion, and a relay portion. As shown in FIG. 2, the first communications terminal may include a telescope including an objective lens 210, an eyepiece lens 212, and an aperture 214 (or opening) through which light may enter and exit the communications terminal. For ease of representation and understanding, the aperture 214 is depicted as distinct from the objective lens 210, though the objective lens 210 may be positioned within the aperture. The first communications terminal may include a circulator or wavelength splitter, such as a single mode circulator 218, that routes incoming light and outgoing light while keeping them on at least partially separate paths. The first communications terminal may include one or more sensors 220 for detecting measurements of environmental features and/or system components.

The first communications terminal 102 may include one or more steering mechanisms, such as one or more bias means for controlling one or more phase shifters, which may be part of the OPA architecture 114, and/or an actuated/ steering mirror (not shown), such as a fast/fine pointing mirror. In some examples, the actuated mirror may be a MEMS 2-axis mirror, 2-axis voice coil mirror, or a piezo-electric 2-axis mirror. The one or more processors 104, such as those in the processing unit 203, may be configured to receive and process signals from the one or more sensors 220, the transceiver chip 112, and/or the OPA architecture 114 and to control the one or more steering mechanisms to adjust a pointing direction and/or wavefront shape. The first communications terminal also includes optical fibers, or waveguides, connecting optical components, creating a path between the seed laser 116 and OPA architecture 114 and a path between the OPA architecture 114 and the sensor 118.

Returning to FIG. 1, the second communications terminal 122 may output the Tx signals as an optical communications beam 20b (e.g., light) pointed towards the first communications terminal 102, which receives the optical communications beam 20b (e.g., light) as corresponding Rx signals. In this regard, the second communications terminal 122 includes one or more processors, 124, a memory 126, a transceiver chip 132, and an OPA architecture 134. The one or more processors 124 may be similar to the one or more processors 104 described above.

Memory 126 may store information accessible by the one or more processors 124, including data 128 and instructions 130 that may be executed by processor 124. Memory 126, data 128, and instructions 130 may be configured similarly to memory 106, data 108, and instructions 110 described above. In addition, the transceiver chip 132 and the OPA architecture 134 of the second communications terminal 122 may be similar to the transceiver chip 112 and the OPA architecture 114. The transceiver chip 132 may include both transmitter components and receiver components. The transmitter components may include a light source, such as seed laser 136 configured similar to the seed laser 116. Other transmitter components may include an amplifier, such as a high-power semiconductor optical amplifier. The receiver components may include a sensor 138 configured similar to sensor 118. Other receiver components may include an attenuator, such as a variable optical attenuator, an amplifier, such as a semiconductor optical amplifier, or a filter. The OPA architecture 134 may include an OPA chip including a micro-lens array, a plurality of emitters, a plurality of phase shifters. Additional components for supporting functions of the second communications terminal 122 may be included similar to the additional components described above. The second communications terminal 122 may have a system architecture that is same or similar to the system architecture shown in FIG. 2.

Figure 3:
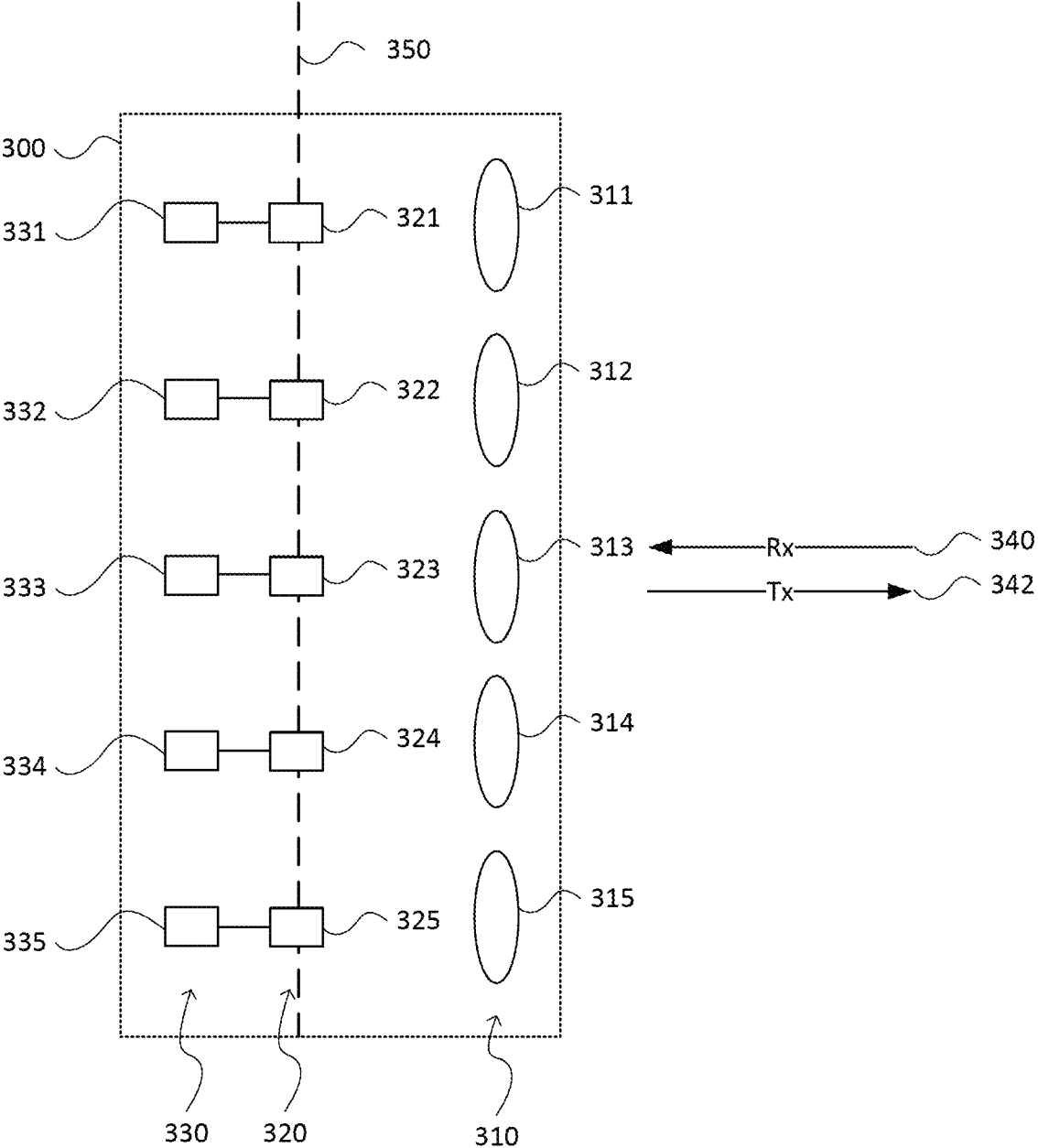
FIG. 3 represents features of an OPA architecture represented as an example OPA chip in accordance with aspects of the disclosure.

FIG. 3 represent features of OPA architecture 114 represented as an example OPA chip 300 including representations of a micro-lens array 310, a plurality of emitters 320, and a plurality of phase shifters 330. For clarity and ease of understanding, additional waveguides and other features are not depicted. Arrows 340, 342 represent the general direction of Tx signals (transmitted optical communications beam) and Rx signals (received optical communications beam) as such signals pass or travel through the OPA chip 300.

The micro-lens array 310 may include a plurality of convex micro-lenses 311-315 that focus the Rx signals onto respective ones of the plurality emitters positioned at the focal points of the micro-lens array. In this regard, the dashed-line 350 represents the focal plane of the micro-lenses 311-315 of the micro-lens array 310. The micro-lens array 310 may be arranged in a grid pattern with a consistent pitch, or distance, between adjacent lenses. In other examples, the micro-lens array 310 may be in different arrangements having different numbers of rows and columns, different shapes, and/or different pitch (consistent or inconsistent) for different lenses.

Each micro-lens of the micro-lens array may be 10's to 100's of micrometers in diameter and height. In addition, each micro-lens of the micro-lens array may be manufactured by molding, printing, or etching a lens directly into a wafer of the OPA chip 300. Alternatively, the micro-lens array 310 may be molded as a separately fabricated micro-lens array. In this example, the micro-lens array 310 may be a rectangular or square plate of glass or silica a few mm (e.g., 10 mm or more or less) in length and width and 0.2 mm or more or less thick. Integrating the micro-lens array within the OPA chip 300 may allow for the reduction of the grating emitter size and an increase in the space between emitters. In this way, two-dimensional waveguide routing in the OPA architecture may better fit in a single layer optical phased array. In other instances, rather than a physical micro-lens array, the function of the micro-lens array may be replicated using an array of diffractive optical elements (DOE).

Each micro-lens of the micro-lens array may be associated with a respective emitter of the plurality of emitters 320. For example, each micro-lens may have an emitter from which Tx signals are received and to which the Rx signals are focused. As an example, micro-lens 311 is associated with emitter 321. Similarly, each micro-lens 312-315 also has a respective emitter 322-325. In this regard, for a given pitch (i.e., edge length of a micro-lens edge length) the micro-lens focal length may be optimized for best transmit and receive coupling to the underlying emitterx 38 This arrangement may thus increase the effective fill factor of the Rx signals at the respective emitter, while also expanding the Tx signals received at the micro-lenses from the respective emitter before the Tx signals leave the OPA chip 300.

The plurality of emitters 320 may be configured to convert emissions from waveguides to free space and vice versa. The emitters may also generate a specific phase and intensity profile to further increase the effective fill factor of the Rx signals and improve the wavefront of the Tx signals. The phase and intensity profile may be determined using inverse design or other techniques in a manner that accounts for how transmitted signals will change as they propagate to and through the micro-lens array. The phase profile may be different from the flat profile of traditional grating emitters, and the intensity profile may be different from the gaussian intensity profile of traditional grating emitters. However, in some implementations, the emitters may be Gaussian field profile grating emitters.

The phase shifters 330 may allow for sensing and measuring Rx signals and the altering of Tx signals to improve signal strength optimally combining an input wavefront into a single waveguide or fiber. Each emitter may be associated with a phase shifter. As shown in FIG. 3, each emitter may be connected to a respective phase shifter. As an example, the emitter 320 is associated with a phase shifter 330. The Rx signals received at the phase shifters 331-335 may be provided to receiver components including the sensor 118, and the Tx signals from the phase shifters 331-335 may be provided to the respective emitters of the plurality of emitters 320. The architecture for the plurality of phase shifters 330 may include at least one layer of phase shifters having at least one phase shifter connected to an emitter of the plurality of emitters 320. In some examples, the phase shifter architecture may include a plurality of layers of phase shifters, where phase shifters in a first layer may be connected in series with one or more phase shifters in a second layer.

A communication link 22 may be formed between the first communications terminal 102 and the second communications terminal 122 when the transceivers of the first and second communications terminals are aligned. The alignment can be determined using the optical communications beams 20a, 20b to determine when line-of-sight is established between the communications terminals 102, 122. Using the communication link 22, the one or more processors 104 can send communication signals using the optical communications beam 20a to the second communications terminal 122 through free space, and the one or more processors 124 can send communication signals using the optical communications beam 20b to the first communications terminal 102 through free space. The communication link 22 between the first and second communications terminals 102, 122 allows for the bi-directional transmission of data between the two devices. In particular, the communication link 22 in these examples may be free-space optical communications (FSOC) links. In other implementations, one or more of the communication links 22 may be radio-frequency communication links or other type of communication link capable of traveling through free space.

Figure 4:
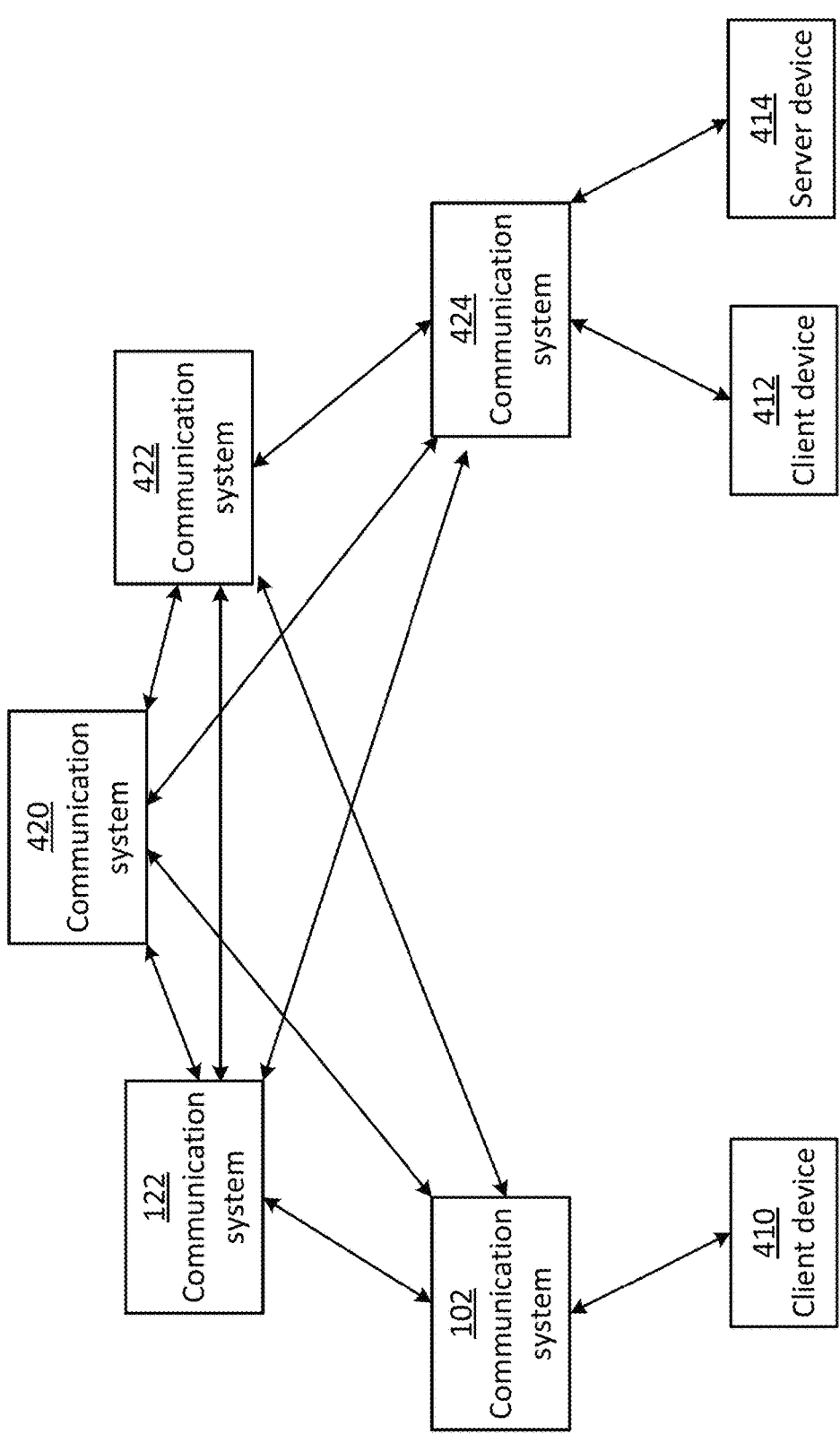
FIG. 4 is a pictorial diagram of a network in accordance with aspects of the disclosure.

As shown in FIG. 4, a plurality of communications terminals, such as the first communications terminal 102 and the second communications terminal 122, may be configured to form a plurality of communication links (illustrated as arrows) between a plurality of communications terminals, thereby forming a network 400. The network 400 may include client devices 410 and 412, server device 414, and communications terminals 102, 122, 420, 422, and 424. Each of the client devices 410, 412, server device 414, and communications terminals 420, 422, and 424 may include one or more processors, a memory, a transceiver chip, and an OPA architecture (e.g., OPA chip or chips) similar to those described above. Using the transmitter and the receiver, each communications terminal in network 400 may form at least one communication link with another communications terminal, as shown by the arrows. The communication links may be for optical frequencies, radio frequencies, other frequencies, or a combination of different frequency bands. In FIG. 4, the first communications terminal 102 is shown having communication links with client device 410 and communications terminals 122, 420, and 422. The second communications terminal 122 is shown having communication links with communications terminals 102, 420, 422, and 424.

The network 400 as shown in FIG. 4 is illustrative only, and in some implementations the network 400 may include additional or different communications terminals. The network 400 may be a terrestrial network where the plurality of communications terminals is on a plurality of ground communications terminals. In other implementations, the network 400 may include one or more high-altitude platforms (HAPs), which may be balloons, blimps or other dirigibles, airplanes, unmanned aerial vehicles (UAVs), satellites, or any other form of high-altitude platform, or other types of moveable or stationary communications terminals. In some implementations, the network 400 may serve as an access network for client devices such as cellular phones, laptop computers, desktop computers, wearable devices, or tablet computers. The network 400 also may be connected to a larger network, such as the Internet, and may be configured to provide a client device with access to resources stored on or provided through the larger computer network.

Example Methods

An adjustment of a plurality of phase shifters of an OPA may be accomplished via the TD mode dithering. In the TD mode dithering, subsets of a plurality of phase shifters may be dithered and corrected in an iterative process over time.

FIG. 5 illustrates an example method 500 of adjusting a plurality of phase shifters of an OPA using the TD mode dithering. For example, at block 510, the method includes identifying a first subset of phase shifters of the plurality of phase shifters based on an orthogonal set of functions. In this regard, the first subset of phase shifters may be identified using a function of an orthogonal set of functions. For instance, the phase shifters contained in a first subset may be identified by a first function of the orthogonal set of functions. The orthogonal set of functions may be a discrete orthonormal basis set. In order to identify the subsets of phase shifters, each function of the orthogonal set of functions may contain the same number of elements as the number of phase shifters of the plurality of phase shifters.

In some implementations, the orthogonal set of functions may be 2D Walsh functions having elements that have a direct mapping to the phase shifters of the plurality of phase shifters. Thus, the first subset of phase shifters may be identified according to the values of the elements in one of the functions of the orthogonal set of functions. In this regard, for any given function, half of the plurality of phase shifters may be identified in a given subset. As shown at block 520, the method includes performing a first dither on the first subset of phase shifters of the plurality of phase shifters using a first frequency. In this regard, a first dither may be performed. To do this, a first perturbation at a first predetermined frequency may be applied to a wavefront at a first subset of the phase shifters at a first time.

In some instances, during the first dither, only the first perturbation may be applied to the wavefront at the first subset of phase shifters. In this regard, the plurality of phase shifters of the OPA may be adjusted without applying additional perturbations during the first dither, which may avoid the use of additional time, resources, processing data, etc. Moreover, applying only the first perturbation during the first dither is particularly advantageous when performing the first dither in real time on a dynamic system. In this regard, adjustments of the plurality of phase shifters may be conducted while the OPA is transmitting and/or receiving optical communications beams.

In some instances, the first perturbation may be a sine function, cosine function, and/or a square wave function utilizing a first predetermined frequency of a plurality of predetermined frequencies. In some instances, as additional dithers are performed, these may be made at the same or a different one of the plurality of predetermined frequencies. In some instances, each of the plurality of predetermined frequencies may be unique. In such instances, the plurality of predetermined frequencies may be selected such that they do not interfere with one another.

Additionally or alternatively, in some instances, each of the plurality of predetermined frequencies may not be unique. In such instances, the perturbation of the plurality of perturbations utilizing the same frequencies, or frequencies that may interfere, may be selected such that they will not interfere. For example, if two perturbations utilize the same frequency, one perturbation may be utilized via a sine function and the other may be utilized a cosine function where one of the functions may be shifted by $\pi/2$ such that the perturbations are orthogonal and/or out of phase.

In some implementations, a magnitude of the first perturbation or first dither magnitude may be configured to be large enough to be detectable (e.g., large enough signal-to-noise ratio) but small enough as not to add significant phase error, causing additional power loss. In some implementations, the utilized magnitude may be greater than the magnitude of the one or more static and/or dynamic variables. In this regard, in some implementations a magnitude of the one or more static and/or dynamic variables may be measured. For example, if the one or more static and/or dynamic variables are environmental variables (e.g., platform vibration, wind), one or more measurements of the environmental variables may be collected by one or more sensors of an optical communications terminal. A magnitude of the one or more variables may be extrapolated from the one or more measurements (e.g., directly measured, estimated based on the one or more measurements). In one example, a dither magnitude may be on the order of $\pi/8$ or $\pi/10$ which results in about −0.4 dB to −0.7 dB power changes.

The phase shifters may have an initial set of phase shifter values. The initial set of phase shifter values may be the amount by which each phase shifter modifies an optical communications beam. Each phase shift value of the set of initial phase shifter values corresponding to each phase shifter of the first subset may be adjusted according to the first perturbation. The adjustment may result in a first set of phase shifter values. The OPA may utilize the first set of phase shifter values to transmit or receive a wavefront of an optical communications beam.

As shown at block 530, the method includes, determining a first correction based on a first output of the OPA resulting from the first dither. In this regard, a first power and/or intensity reading (e.g., power and/or intensity output of the OPA) of a wavefront of an optical communications beam may be observed. In one implementation, the first power and/or intensity reading may be indicative of a change in a power and/or intensity resulting from the first perturbation. The first power and/or intensity reading resulting from the first perturbation may be used to determine a first correction (e.g., a first change in phase). For example, the power and/or intensity reading may be used to determine a first change in phase.

As shown at block 540, the method includes, adjusting the first subset of phase shifters of the plurality of phase shifters using the first corrections, the adjustment resulting in a first set of corrected phase shifter values. In this regard, the initial set of phase shifter values may be adjusted via the application of the first correction. The application may result in a first corrected set of phase shifter values.

In one example, the direction of the first correction (e.g., the change in phase) may be based on the change in the power and/or intensity resulting from the first perturbation. In one example, the first perturbation may include perturbing in a positive direction. In another example, the first perturbation may include perturbing in a negative direction. In some implementations, the first perturbation may include perturbing one or more phase shifters of the first subset of phase shifters in a first direction and one or more phase shifters of the first subset of phase shifters in a second direction. The first direction may be a positive direction and the second direction may be a negative direction. In this regard, the first correction may include differing corrections based on the perturbation direction. For instance, if a positive change in power and/or intensity is observed, the first correction may include increasing the phase shifter values of the initial set of phase shifter values corresponding to the one or more phase shifters perturbed in a positive direction and decreasing the phase shifter values of the initial set of phase shifter values corresponding to the one or more phase shifters perturbed in a negative direction. If a negative change in power and/or intensity is observed the first correction may include decreasing the phase shifter values of the initial set of phase shifter values corresponding to the one or more phase shifters perturbed in a positive direction and increasing the phase shifter values of the initial set of phase shifter values corresponding to the one or more phase shifters perturbed in a negative direction. Additionally or alternatively, an observed decrease in power and/or intensity may the first correction may include no modification of the phase shifter values of the initial set of phase shifter values corresponding to the phase shifters of the first subset. In this regard, the power and/or intensity may be at a global maximum, and any perturbation of the wavefront may lead to a decrease thereof. If no change in power and/or intensity is observed, the first correction may include changing the phase shifter values of the initial set of phase shifters.

In some implementations, the magnitude of the first correction may be proportional, a magnitude of the first perturbation or first dither magnitude. For example, if the magnitude of the amplitude of the first perturbation is relatively large, the first correction may be greater. Similarly, if the magnitude of the amplitude of the first perturbation is relatively small, the first correction may be smaller. In some implementations, the magnitude of the correction may remain below a first threshold value, where values above the first threshold value may result in instability in subsequent dithers. Additionally or alternatively, the magnitude correction may be scaled to avoid instability. In this regard, the magnitude of correction may be scaled utilizing a damping factor (e.g., 0.75). The scaling may prevent, for example, overshooting corrections. Moreover, scaling may be advantageous in a system where greater noise is present.

In some implementations, a magnitude of the first perturbation or first dither magnitude may be selected such that the first perturbation is detectable in the presence of noise and may cause minimal to no reduction in coupling efficiency between terminals. In this regard, the first dither magnitude may be large enough to remain detectable but not so large as to significantly reduce the coupling efficiency or data flow.

In some implementations, a second dither may be performed at a second time. The second dither may include applying a second perturbation at a second predetermined frequency to a wavefront of a second subset of phase shifters. In some instances, the second perturbation may be the same as the first perturbation at the first predetermined frequency may be used. Alternatively, the second perturbation may be different from the first perturbation as a second predetermined frequency may be different from as the first predetermined frequency may be used. The second dither may follow the process of the first dither, discussed above, for the second subset of phase shifters. The second subset of phase shifters may be determined using a second function of the orthogonal set of functions. In such an implementation the first corrected set of phase shifter values may be used as the initial set of phase shifter values.

In some implementations, further dithers may be performed. The number of dithers performed may correspond to a number of functions in the orthogonal set of functions, and thereafter the dithers may start again with the first function of the orthogonal set of functions and so on. In some implementations, the number of functions may correspond to the total number of phase shifters. In another implementation, the number of dither functions of the set of dither functions may be determined based on one or more static and/or dynamic variables. In such an implementation, the number of dither functions may be related to the randomness (e.g., the amount by which the error correlates from phase shifter to phase shifter) of the errors caused by the one or more static and/or dynamic variables. For instance, if the error is random (e.g., little or no correlation in errors across the phase shifters), a greater number of dither functions may be utilized. If the error is less random (e.g., some correction in errors across the phase shifters), less dither functions may be utilized.

An adjustment of a plurality of phase shifters of an OPA may be accomplished via the FD mode dithering. In the FD mode dithering, subsets of the plurality of phase shifters may be dithered using different frequencies simultaneously.

FIG. 6 illustrates an example method 600 of adjusting a plurality of phase shifters of an OPA using the FD mode dithering. For example, at block 610, the method includes identifying a plurality of subsets of phase shifters of the plurality of phase shifters based on an orthogonal set of functions. In this regard, each of the subsets of phase shifters may be identified using a function of an orthogonal set of functions. For instance, the phase shifters contained in a first subset may be identified by a first function of the orthogonal set of functions, the phase shifters contained in a second subset may be identified by a second function of the orthogonal set of functions, and so on. The orthogonal set of functions may be a discrete orthonormal basis set. In order to identify the subsets of phase shifters, each function of the orthogonal set of functions may contain the same number of elements as the number of phase shifters of the plurality of phase shifters.

In some implementations, the orthogonal set of functions may be 2D Walsh functions having elements that have a direct mapping to the phase shifters of the plurality of phase shifters. Thus, the subsets of phase shifters may be identified according to the values of the elements in each function. In this regard, for any given function, half of the plurality of phase shifters may be identified in a given subset.

As shown at block 620, the method includes performing a plurality of dithers concurrently on the plurality of subsets of phase shifters of the plurality of phase shifters using a predetermined set of frequencies. To do this, a plurality of perturbations at a plurality of predetermined frequencies may be applied to a wavefront at the subsets of phase shifters at once. For example, a first perturbation of the plurality of perturbations at a corresponding first frequency of the plurality of the predetermined frequencies at the first subset. Concurrently, the OPA may apply a second perturbation of the plurality of perturbations at a corresponding second frequency of the plurality of the predetermined frequencies at the second subset. The OPA may concurrently apply additional perturbations of the plurality of perturbations at corresponding frequencies of the plurality of the predetermined frequencies into additional subsets of the plurality of subsets of phase shifters.

In some instances, during each dither of the plurality of dithers, only one perturbation may be applied to the wavefront at each of the plurality of subsets of phase shifters. For example, during the first dither, only the first perturbation may be applied at the first frequency at the first subset of phase shifters. Concurrently, during the second dither, only the second perturbation may be applied at the second frequency at the second subset of phase shifters. In this regard, the plurality of phase shifters of the OPA may be adjusted without applying additional perturbations during each of the plurality of dithers, which may avoid the use of additional time, resources, processing data, etc. Moreover, applying only one perturbation during each of the plurality of dithers is particularly advantageous when performing the plurality of dithers in real time on a dynamic system. In this regard, adjustments of the plurality of phase shifters may be conducted while the OPA is transmitting and/or receiving optical communications beams.

In some instances, the plurality of perturbations may be sine function, cosine functions, or square wave functions each utilizing one of the plurality of predetermined frequencies. In some instances, each of the plurality of predetermined frequencies may be unique. In such instances, the plurality of predetermined frequencies may be selected such that they do not interfere with one another.

Additionally or alternatively, in some instances, each of the plurality of predetermined frequencies may not be unique. In such instances, the perturbation of the plurality of perturbations utilizing the same frequencies, or frequencies that may interfere, may be selected such that they will not interfere. For example, if two perturbations utilize the same frequency, one perturbation may be utilized via a sine function and the other may be a cosine function where one of the functions may be shifted by $\pi/2$ such that the perturbations are orthogonal and/or out of phase.

In some implementations, a plurality of magnitudes of the plurality of perturbations or plurality of dither magnitudes may be configured to be large enough to be detectable (e.g., large enough signal-to-noise ratio) but small enough as not to add significant phase error, causing additional power loss. In some implementations, the utilized plurality of dither magnitudes may be greater than the magnitude of the one or more static and/or dynamic variables. In this regard, in some implementations a magnitude of the one or more static and/or dynamic variables may be measured. For example, if the one or more static and/or dynamic variables are environmental variables (e.g., platform vibration, wind), one or more measurements of the environmental variables may be collected by one or more sensors of an optical communications terminal. A magnitude of the one or more variables may be extrapolated from the one or more measurements (e.g., directly measured, estimated based on the one or more measurements). In one example, a dither magnitude of the plurality of dither magnitudes may be on the order of $\pi/8$ or $\pi/10$ which results in about –0.4 dB to –0.7 dB power changes.

The phase shifters may have an initial set of phase shifter values each of which may be adjusted according to any applied perturbations. The initial set of phase shifter values may be the amount by which each phase shifter modifies a wavefront of an optical communications beam. Each of the initial set of phase shifter values of the phase shifters of a subset may be varied according to each of the corresponding perturbations applied. For example, the phase shifter values of the initial set of phase shifter values corresponding to the phase shifters of the first subset may be varied according to the first perturbation. The variation may result in a first set of phase shifter values. Similarly, the phase shifter values of the initial set of phase shifter values corresponding to the phase shifters of the second subset may be varied according to the second perturbation. The variation may result in a second subset of phase shifter values.

Following the injection of the plurality of perturbations, the resultant variations of the initial set of phase shifter values corresponding to each perturbation may be combined or summed to identify a modified set of phase shifter values. In some instances, multiple perturbations corresponding to different frequencies (or sine/cosine combinations) may be summed and applied to the same phase shifter. The OPA may then utilize the modified set of phase shifter values to transmit or receive a wavefront of an optical communications beam.

As shown in block 630, the method includes, determining a plurality of corrections based on an output of the OPA resulting from the plurality of dithers. In this regard, a power and/or intensity reading (e.g., power and/or intensity output of the OPA) of a wavefront of an optical communications beam may be observed. The power and/or intensity reading of the optical communications beam may be demodulated such that a plurality of power and/or intensity readings resulting from each of the plurality of perturbations (e.g., each frequency) may be obtained. The plurality of power and/or intensity readings may be indicative of a change in a power and/or intensity resulting for each of the plurality of perturbations. The power and/or intensity readings resulting from each perturbation may be used to determine a plurality of corrections (e.g., a plurality of changes in phase). For example, the power and/or intensity readings of the wavefront may be demodulated into a first power and/or intensity reading resulting from the first perturbation and a second power and/or intensity reading resulting from the second perturbation. In this regard, the first power and/or intensity reading may be used to determine a first correction (e.g., a first change in phase) and the second power and/or intensity reading may be used to determine a second correction (e.g., a second change in phase). By way of example, each of the plurality of power and/or intensity reading may be used to determine each of a plurality of changes in phase.

As shown at block 640, the method includes adjusting the plurality of subsets of phase shifters of the plurality of phase shifters using the plurality of corrections, the adjustment resulting in a first set of corrected phase shifter values. The plurality of corrections corresponding to each of the plurality of perturbations may be summed or combined. The initial set of phase shifter values may be adjusted via the application of the summed or combined plurality of corrections. The application may result in a corrected set of phase shifter values. For example, the first correction and the second correction may be summed or combined and applied to the initial set of phase shifter values resulting in a first set of corrected phase shifter values.

In one example, the direction of the first correction (e.g., the first change in phase) may be based on the first change in the power and/or intensity resulting from the first perturbation. In one example, the first perturbation may include perturbing in a positive direction. In another example, the first perturbation may include perturbing in a negative direction In some implementations, the first perturbation may include perturbing one or more phase shifters of the first subset of phase shifters in a first direction and one or more phase shifters of the first subset of phase shifters in a section direction. The first direction may be a positive direction and the second direction may be a negative direction. In this regard, the first correction may include differing corrections based on the perturbation direction. For instance, if a positive change in power and/or intensity is observed, the first correction may include increasing the phase shifter values of the initial set of phase shifter values corresponding to the one or more phase shifters perturbed in a positive direction and decreasing the phase shifter values of the initial set of phase shifter values corresponding to the one or more phase shifters perturbed in a negative direction. If a negative change in power and/or intensity is observed the first correction may include decreasing the phase shifter values of the initial set of phase shifter values corresponding to the one or more phase shifters perturbed in a positive direction and increasing the phase shifter values of the initial set of phase shifter values corresponding to the one or more phase shifters perturbed in a negative direction. Additionally or alternatively, an observed decrease in power and/or intensity may the first correction may include no modification of the phase shifter values of the initial set of phase shifter values corresponding to the phase shifters of the first subset. In this regard, the power and/or intensity may be at a global maximum, and any perturbation of the wavefront may lead to a decrease thereof. If no change in power and/or intensity is observed, the first correction may include changing the phase shifter values of the initial set of phase shifters.

The second correction may be determined in the same manner as discussed above with regard to the first correction. In some implementations, the combination of first and second corrections may result in a lesser overall correction. For example, if the first correction involves increasing the phase shifter values of the initial set of phase shifter values and the second correction involves decreasing the phase shifter values of the initial set of phase shifter values, the overall adjustment or applied correction may be smaller in magnitude than the first or second corrections.

In some implementations, additional subsets may be dithered. In such an implementation, additional corrections may be determined in the same manner as the first and second corrections discussed above.

In some implementations, the magnitude of each correction may be proportional to a magnitude of the corresponding perturbation of dither magnitude. For example, if the magnitude of the amplitude of the first perturbation is relatively large, the first correction may be greater. Similarly, if the magnitude of the amplitude of the first perturbation is relatively small, the first correction may be smaller. In some implementations, the magnitude of each correction may remain below a first threshold value, where values above the first threshold value may result in instability in subsequent dithers. Additionally or alternatively, the magnitude correction may be scaled to avoid instability. In this regard, the magnitude of correction may be scaled utilizing a damping factor (e.g., 0.75). The scaling may prevent, for example, overshooting corrections. Moreover, scaling may be advantageous in a system where greater noise is present.

In some implementations, a magnitude of each perturbation or each dither magnitude may be above selected such that the first perturbation is detectable in the presence of noise and may cause minimal to no reduction in coupling efficiency between terminals. In this regard, the dither magnitude may be large enough to remain detectable but not so large as to significantly reduce the coupling efficiency or data flow.

In some implementations, the FD mode dithering discussed above may be repeated continuously (e.g., repeated at successive timesteps such as a first time, a second time, etc.). In such an implementation, the corrected set of phase shifter values may be the initial set of phase shifter values in subsequent dithers. In some implementations, the plurality of frequencies at differing times may be distinct (e.g., contain different frequencies, contain different amounts of frequencies). Additionally or alternatively, the plurality of functions from the set of orthogonal functions at differing times may be distinct (e.g., contain different functions, contain different amounts of functions).

An adjustment of a plurality of phase shifters of an OPA may additionally be accomplished via hybrid TD-FD mode dithering. In the hybrid TD-FD mode dithering, subsets of the plurality of phase shifters may be dithered using the same frequency in an iterative process over time. Additionally, the dither frequency may correspond to a particular terminal.

FIG. 7 illustrates an example method 700 of adjusting a plurality of phase shifters of an OPA using the hybrid TD-FD mode dithering. The method 700 may be performed by one or more processors 104, 124 of an optical communications terminal 102,122. The optical communications terminal 102,122 may be part of a system of a plurality of optical communications devices and client devices, such as the network 400 described above in FIG. 4. For example, at block 710, the method includes identifying a plurality of subsets of phase shifters of the plurality of phase shifters based on an orthogonal set of functions. In this regard, each of the subsets of phase shifters may be identified using a function of an orthogonal set of functions. For instance, the phase shifters contained in a first subset may be identified by a first function of the orthogonal set of functions, the phase shifters contained in a second subset may be identified by a second function of the orthogonal set of functions, and so on. The orthogonal set of functions may be a discrete orthonormal basis set. In order to identify the subsets of phase shifters, each function of the orthogonal set of functions may contain the same number of elements as the number of phase shifters of the plurality of phase shifters.

In some implementations, the orthogonal set of functions may be the aforementioned 2D Walsh functions having elements that have a direct mapping to the phase shifters of the plurality of phase shifters. Thus, the subsets of phase shifters may be identified according to the values of the elements in each function. In this regard, for any given function, half of the plurality of phase shifters may be identified in a given subset.

As shown at block 720, the method includes performing a plurality of dithers iteratively on the plurality of subsets of phase shifters of the plurality of phase shifters using the same frequency. For example, a first dither on the first subset of phase shifters of the plurality of subsets using a terminal frequency. The terminal frequency may be unique to the optical communications terminal in which the OPA is contained. In this regard, a first dither may be performed. To do this, a first perturbation at the terminal frequency may be applied to a wavefront at a first subset of the phase shifters at a first time. Additionally, a second dither may be performed at a second time, following the first time. The second dither may include applying a second perturbation at a second predetermined frequency to a wavefront of a second subset of phase shifters.

In some instances, during each dither of the plurality of dithers, only one perturbation may be applied to the wavefront at each of the plurality of subsets of phase shifters. For example, during the first dither, only the first perturbation may be applied at the terminal frequency at the first subset of phase shifters. Then, during the second dither, only the second perturbation may be applied at the terminal frequency at the second subset of phase shifters. In this regard, the plurality of phase shifters of the OPA may be adjusted without applying additional perturbations during each of the plurality of dithers, which may avoid the use of additional time, resources, processing data, etc. Moreover, applying only one perturbation during each of the plurality of dithers is particularly advantageous when performing the plurality of dithers in real time on a dynamic system. In this regard, adjustments of the plurality of phase shifters may be conducted while the OPA is transmitting and/or receiving optical communications beams.

In some instances, the plurality of perturbations may be sine functions, cosine functions, or square wave functions each utilizing the terminal frequency. In such instances, each perturbation of the plurality of perturbations may be selected such that they will not interfere with subsequent perturbations. For example, one perturbation may be a sine function and the other may be a cosine function where one of the functions may be shifted by $\pi/2$ such that the perturbations are orthogonal and/or out of phase.

In some instances, performing the plurality of dithers iteratively on the plurality of subsets of phase shifters of the plurality of phase shifters using the same frequency may include performing at least two dithers at a first time on at least two subsets of phase shifters and performing at least two dithers at a first time on at least two subsets of phase shifters at a second time. In this regard, at least two perturbations may be applied to the wavefront at the first time. The at least two perturbations may be selected such that they will not interfere with each other. For example, one of the at least two perturbations may be a sine function and the other may be a cosine function where one of the functions may be shifted by $\pi/2$ such that the perturbations are orthogonal and/or out of phase. In such an instance, at least two perturbations may be applied to the wavefront at the second time in the same or similar manner as the at least two perturbations applied to the wavefront at the first time.

In some implementations, a plurality of magnitudes of the plurality of perturbations or plurality of dither magnitudes may be configured to be large enough to be detectable (e.g., large enough signal-to-noise ratio) but small enough as not to add significant phase error, causing additional power loss. In some implementations, the utilized plurality of dither magnitudes may be greater than the magnitude of the one or more static and/or dynamic variables. In this regard, in some implementations a magnitude of the one or more static and/or dynamic variables may be measured. For example, if the one or more static and/or dynamic variables are environmental variables (e.g., platform vibration, wind), one or more measurements of the environmental variables may be collected by one or more sensors of an optical communications terminal. In some instances, the magnitude of the one or more variables may be extrapolated from the one or more measurements (e.g., directly measured, estimated based on the one or more measurements). In one example, a dither magnitude of the plurality of dither magnitudes may be on the order of $\pi/8$ or $\pi/10$ which results in about $-0.4$ dB to $-0.7$ dB power changes.

The phase shifters may have an initial set of phase shifter values each of which may be adjusted according to any applied perturbations. The initial set of phase shifter values may be the amount by which each phase shifter modifies a wavefront of an optical communications beam. In some instances, the initial set of phase shifter values of the phase shifters of a subset may be varied according to each of the corresponding perturbations applied. For example, the phase shifter values of the initial set of phase shifter values corresponding to the phase shifters of the first subset may be varied according to the first perturbation. The variation may result in a first set of phase shifter values. Similarly, the phase shifter values of the initial set of phase shifter values corresponding to the phase shifters of the second subset may be varied according to the second perturbation. The variation may result in a second subset of phase shifter values.

Following the injection of the plurality of perturbations, the resultant variations of the initial set of phase shifter values corresponding to each perturbation may be combined or summed to identify a modified set of phase shifter values. In some instances, multiple perturbations corresponding to different frequencies (or sine/cosine combinations) may be summed and applied to the same phase shifter. The OPA may then utilize the modified set of phase shifter values to transmit or receive a wavefront of an optical communications beam.

In some instances, the initial set of phase shifter values may be iteratively adjusted. In this regard, the corrections of each prior dither may be built upon. By way of example, the initial set of phase shifter values may be adjusted resulting in a first set of corrected phase shifter values (discussed in detail below). Following the adjustment, the second ditherer may be performed where the first set of corrected phase shifter values may be adjusted according to the second perturbation. The adjustment may result in a second set of phase shifter values. The OPA may utilize the second set of phase shifter values to transmit or receive a wavefront of an optical communications beam. In this regard, subsequent perturbations are applied to the set of corrected phase shifter values resulting from the prior dither instead of the initial set of phase shifter values.

As shown in block 730, the method includes determining a plurality of corrections based on a plurality of outputs of the OPA, each output resulting from each of the plurality of dithers. In this regard, a power and/or intensity reading (e.g., power and/or intensity output of the OPA) of a wavefront of an optical communications beam may be observed following each dither. In some instances, each power and/or intensity reading may be indicative of a change in a power and/or intensity resulting from the corresponding perturbation. Each power and/or intensity reading resulting from each perturbation may be used to determine a correction (e.g., a change in phase). For example, a first power and/or intensity reading resulting from the first perturbation may be used to determine a first change in phase. Similarly, a second power and/or intensity reading resulting from the second perturbation may be used to determine a second change in phase. In some instances, the plurality of outputs may be a plurality of transmitted optical communications beams.

As shown at block 740, the method includes adjusting the plurality of subsets of phase shifters of the plurality of phase shifters using the plurality of corrections, the adjustment resulting in at least one set of corrected phase shifter values. In some instances, the plurality of corrections corresponding to each of the plurality of perturbations may be used iteratively to adjust the plurality of subsets of phase shifters. In this regard, the phase shifters may have an initial set of phase shifter values each of which may be iteratively adjusted according to the plurality of corrections. For example, the initial set of phase shifter values may be adjusted via the application of the first correction. The application may result in a first corrected set of phase shifter values. Then, the first set of corrected phase shifter values may be adjusted via application of the second set of phase shifter values according to the second correction. The application resulting in a second corrected set of phase shifter values.

In some instances, the initial set of phase shifter values may be adjusted via the application of a summation or combination of the plurality of corrections. The application may result in a set of corrected phase shifter values. For example, the first correction and the second correction may be summed or combined and applied to the initial set of phase shifter values. The application resulting in a set of corrected phase shifter values.

In some instances, the direction of each correction (e.g., each change in phase) may be based on each change in the power and/or intensity resulting from each perturbation. For example, a perturbation may include perturbing in a positive direction. In another example, the first perturbation may include perturbing in a negative direction In some implementations, a perturbation may include perturbing one or more phase shifters of a subset of phase shifters in a first direction and one or more phase shifters of the subset of phase shifters in a section direction. The first direction may be a positive direction and the second direction may be a negative direction. In this regard, the resulting correction may include differing corrections based on the perturbation direction. For instance, if a positive change in power and/or intensity is observed, the correction may include increasing the phase shifter values corresponding to the one or more phase shifters perturbed in a positive direction and decreasing the phase shifter values corresponding to the one or more phase shifters perturbed in a negative direction. If a negative change in power and/or intensity is observed, the correction may include decreasing the phase shifter values of corresponding to the one or more phase shifters perturbed in a positive direction and increasing the phase shifter values corresponding to the one or more phase shifters perturbed in a negative direction. Additionally or alternatively, an observed decrease in power and/or intensity may the first correction may include no modification of the phase shifter values of the initial set of phase shifter values corresponding to the phase shifters of the first subset. In this regard, the power and/or intensity may be at a global maximum, and any perturbation of the wavefront may lead to a decrease thereof. If no change in power and/or intensity is observed, the first correction may include changing the phase shifter values of the initial set of phase shifters.

In some implementations, the magnitude of each correction may be proportional to a magnitude of the corresponding perturbation of dither magnitude. For example, if the magnitude of the amplitude of the first perturbation is relatively large, the first correction may be greater. Similarly, if the magnitude of the amplitude of the first perturbation is relatively small, the first correction may be smaller. In some implementations, the magnitude of each correction may remain below a first threshold value, where values above the first threshold value may result in instability in subsequent dithers. Additionally or alternatively, the magnitude correction may be scaled to avoid instability. In this regard, the magnitude of correction may be scaled utilizing a damping factor (e.g., 0.75). The scaling may prevent, for example, overshooting corrections. Moreover, scaling may be advantageous in a system where greater noise is present.

In some implementations, a magnitude of each perturbation or each dither magnitude may be selected such that the first perturbation is detectable in the presence of noise and may cause minimal to no reduction in coupling efficiency between terminals. In this regard, the dither magnitude may be large enough to remain detectable but not so large as to significantly reduce the coupling efficiency or data flow.

In some implementations, the hybrid TD-FD mode dithering discussed above may be repeated continuously (e.g., repeated at successive timesteps such as a first time, a second time, etc.). In such an implementation, the corrected set of phase shifter values may be the initial set of phase shifter values in subsequent dithers.

In some instances, the terminal frequency may be an OPA frequency. In this regard, an optical communications terminal may include a plurality of OPAs, each with their own respective OPA frequency. The OPA frequency may be unique to the OPA which utilizes it.

Although the examples described herein relate to N×N or N×M arrays of phase shifters, to maximize the amount of light captured by the optical phased array (OPA), in some instances, the phase shifters may be arranged as a circle instead of a square. However, with the phase shifters arranged this way, the aforementioned 2D Walsh functions may no longer be a useful basis for determining the subsets of phase shifters. In this regard, a set of basis functions optimized for the exact layout of the OPA phase shifters may be needed. In this regard, an orthogonal set of circular functions containing the same number of elements as there are phase shifters of the OPA array may be used. This may thereby provide a direct mapping between the elements of each function and the phase shifters.

Figure 8:
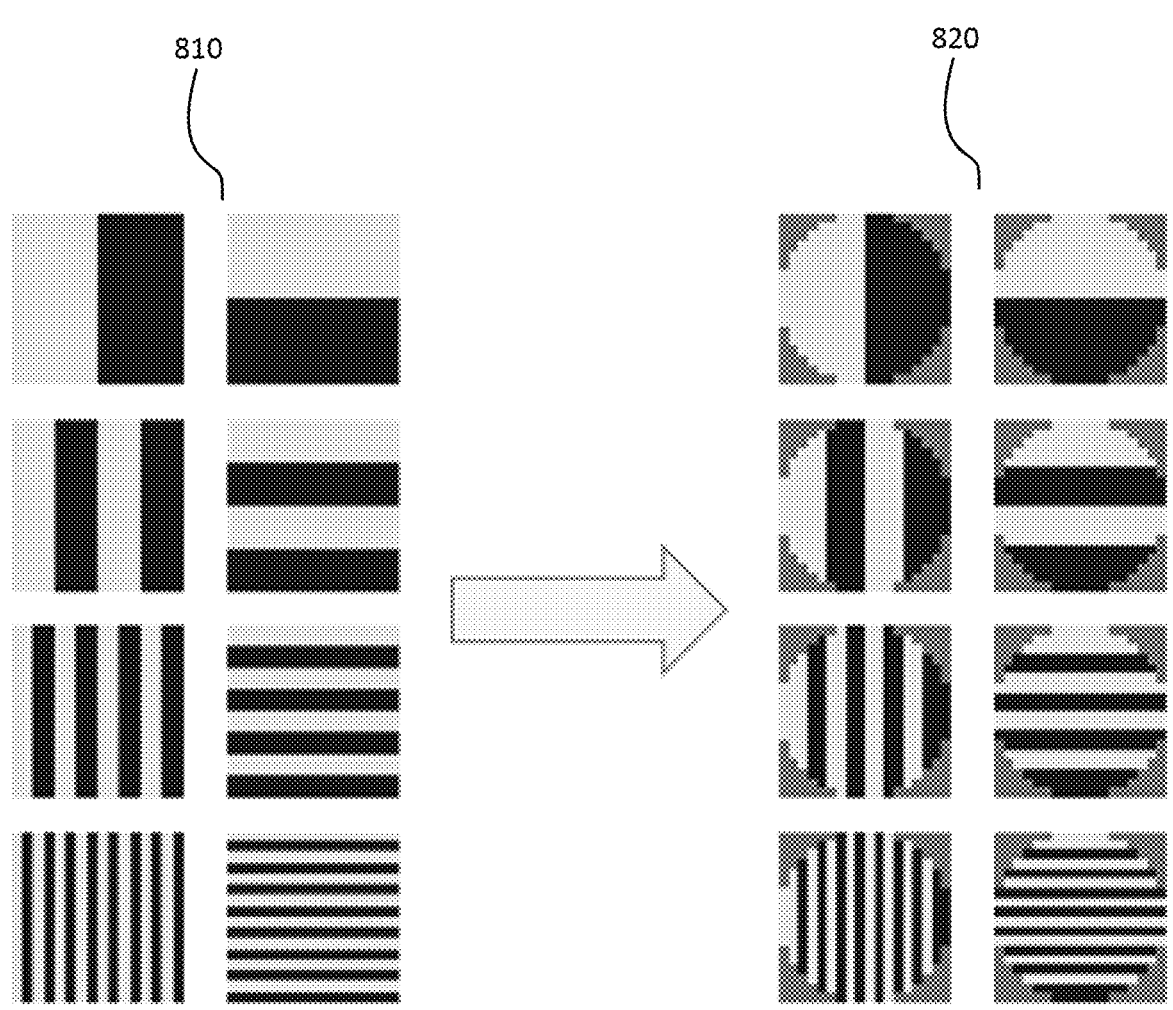
FIG. 8 illustrates a transform of a set of 1D Walsh functions to a set of circular functions.

The set of circular functions may be a discrete orthonormal basis set. In some implementations, the set of circular functions may be obtained using 1D Walsh functions. For example, FIG. 8 illustrates a set of Walsh functions 810 and a set of circular functions 820 obtained using the set of Walsh functions 810.

Figure 9:
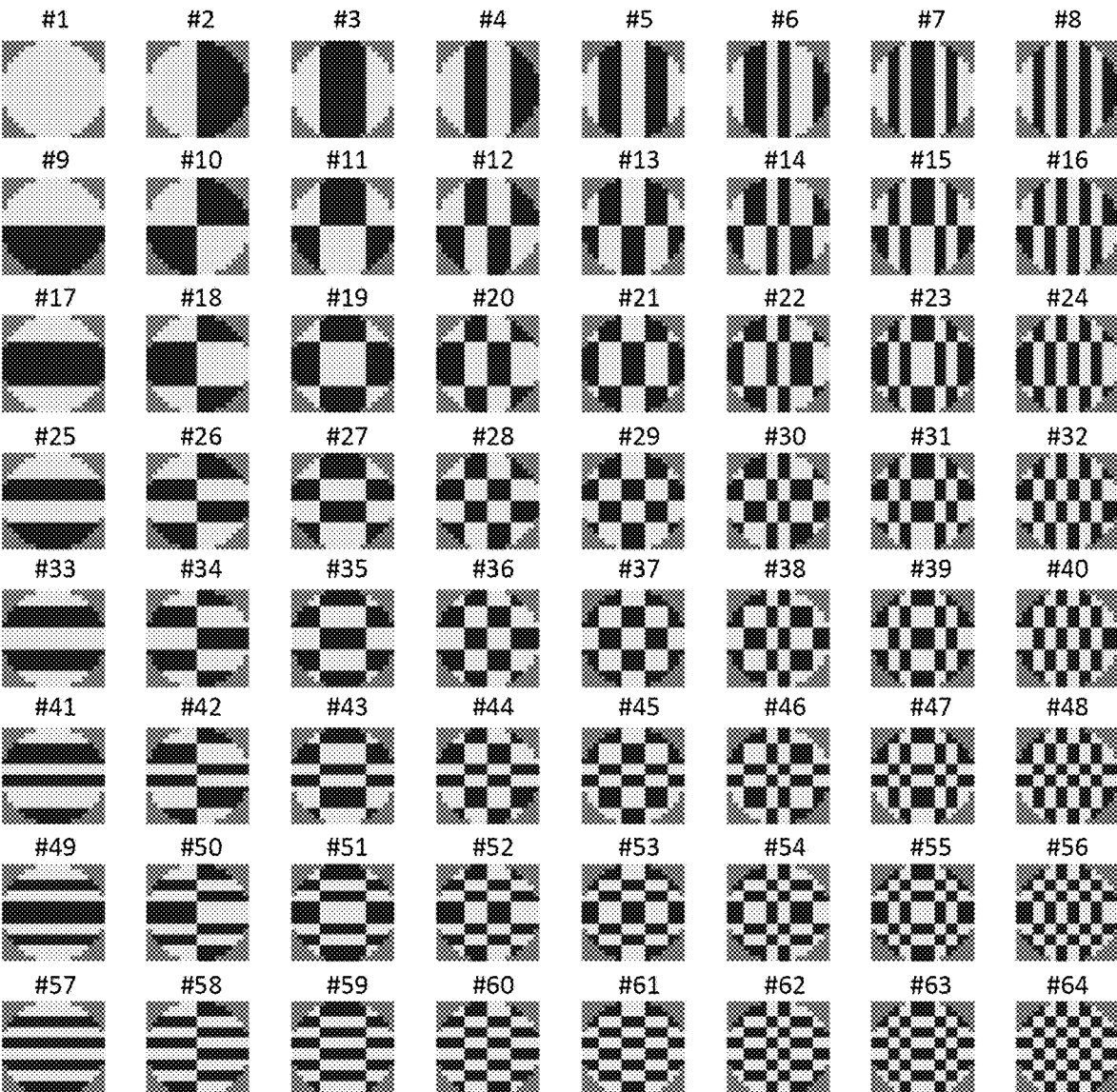
FIG. 9 illustrates an example set of circular functions.

The set of circular functions, obtained from 1D Walsh functions, may be arranged such that they retain their orthogonality. In one example, an OPA array contains 64 elements. In such an example, the set of circular functions may also contain 64 elements. For example, FIG. 9 illustrates a set of circular functions containing elements 1-64.

In some instances, the set of circular functions allows for error correction with fewer functions due to their symmetry. In such an instance, one or more of the one or more static and/or dynamic variables, such as, for example, atmospheric variables, may be at least partially symmetrical. In this regard, use of a set of circular functions in a dithering mode dithering may result in more efficient correction due to their symmetry.

In some implementations, an OPA may use the TD mode dithering for both transmitted and received communications beams of differing optical communications terminals, such as a first and second terminal. In such instances, interference of the dithers may be reduced by using one or more approaches including (1) offsetting the dithers by half a dither period, (2) a first optical communications terminal performs dither at a frequency that is double that of the second optical communications terminal, or (3) compensate for the power variation that an OPA of a first optical communications terminal would experience due to dithers of an OPA of a second terminal.

In the first approach, during TD mode dithering, a pair of optical communications terminals may use a predetermined frequency while conducting each dither. When the predetermined frequencies of the first and second optical communications terminals are the same, the times of the dithers at each optical communications terminal may be synchronized and offset by half a period of the predetermined frequency. The offset may allow each optical communications terminal to dither at the same frequency such that the dithers from each optical communications terminal do not interfere.

FIG. 10 illustrates an example method 1000 of adjusting a plurality of phase shifters of a plurality of OPAs according to the first approach. For example, at block 1010, the method includes performing, at a first OPA of a first communications terminal, a first dither on a first subset of phase shifters of a plurality of phase shifters of the first OPA, wherein the first dither is performed at a first time and a first frequency. As shown at block 1020, the method includes performing, at a second OPA of a second communications terminal, a second dither on a second subset of phase shifters of a plurality of phase shifters of the second OPA, wherein the first dither is performed at a second time and the first frequency, wherein a difference between the first time and the second time is half a period of the first frequency. As shown in block 1030, the method includes adjusting, at the first OPA of the first communications terminal, the first subset of phase shifters of the plurality of phase shifters based on the first dither of the first communications terminal. And, as shown in block 1040, the method includes adjusting, at the first OPA of the first communications terminal, the second subset of phase shifters of the plurality of phase shifters based on the first dither of the second communications terminal.

In the second approach, each optical communications terminal may use a predetermined frequency while conducting each dither. In some implementations, the predetermined frequency of the first optical communications terminal (f) may be double the predetermined frequency of the second optical communications terminal (f/2). In such an approach, the predetermined frequencies, f and f/2, of the first and second optical communications terminal respectively may allow each terminal to perform dithers that do not interfere. In this regard, the dithers of the respective optical communications terminal may not be synchronized.

FIG. 11 illustrates an example method 1100 of adjusting a plurality of phase shifters of a plurality of OPAs according to the second approach. For example, at block 1110 the method includes performing, at a first OPA of a first communications terminal, a first dither on a first subset of phase shifters of a plurality of phase shifters of the first OPA, wherein the first dither is performed at a first frequency. As shown in block 1120, the method includes performing, at a second OPA of a second communications terminal, a second dither on a second subset of phase shifters of a plurality of phase shifters of the second OPA, wherein the second dither is performed at a second frequency, the second frequency being double the first frequency. As shown in block 1130, the method includes adjusting, at the first OPA of the first communications terminal, the first subset of phase shifters of the plurality of phase shifters based on the first dither. And as shown in block 1140, the method includes adjusting, at the second OPA of the first communications terminal, the first subset of phase shifters of the plurality of phase shifters based on the second dither.

In the third approach, the sets of predetermined frequencies of each of the first and second optical communications terminals may not be unique. In such an implementation, a first optical communications terminal may be configured to compensate for variation that an OPA of a second optical communications terminal would experience in an optical communications beam transmitted from an OPA of the first optical communications terminal. The variation may be due to dithers conducted in the OPA of the first optical communications terminal. FIG. 12 illustrates an example method 1200 of adjusting a plurality of phase shifters of a first OPA. according to the third approach. For example, at block 1210 the method includes performing, at a first OPA of a first communications terminal, a first dither on a first subset of phase shifters of a plurality of phase shifters of the first OPA, wherein the first dither is performed at a first frequency.

As shown in block 1220, the method includes estimating, at the first OPA of the first communications terminal, a first change of an output resulting from the first dither. In this regard, the first optical communications terminal may estimate a change in power and/or intensity resulting from a dither conducted in the OPA of the first terminal. In some examples, the estimated change in power and/or intensity may be based on a magnitude of the first perturbation associated with the first dither or first dither magnitude.

As shown in block 1230, the method includes modifying, at the first OPA of the first communications terminal, a first optical communications beam based on the estimated change in the output. The first optical communications terminal may modify a Tx optical communications beam based on the estimated change in power and/or intensity. In this regard, the power and/or intensity of the Tx optical communications beam may be modified by the estimated change in power and/or intensity. By way of example, if a conducted dither would result in an estimated power and/or intensity increase of 10%, the power and/or intensity of the Tx optical communications beam may be decreased by 10%. In another example, if a conducted dither would result in a first estimated power and/or intensity decrease of 10%, the power and/or intensity of the Tx optical communications beam may be increased by 10%. In some implementations, the Tx optical communications beam may be modified by adjusting an optical amplifier of the OPA of the first communications terminal.

Due to the modification, the dither performed on the Tx optical communications beam of the first optical communications terminal may not be perceived when received by the second optical communications terminal. In this regard, the dither performed by the first communications terminal may not affect Tx optical communications beams of the second optical communications terminals.

In some implementations, the second optical communication device may also perform a dither on an optical communications beam transmitted from the OPA of the second optical communication device. The second communications terminal may perform a modification of the Tx optical communications beam in the same manner as the first communications terminal.

In some implementations, an OPA may use the FD mode dithering for both Tx and Rx communications beams of differing optical communications terminals. In such instances, interference of the dithers may be reduced by using one or more approaches including (1) particularly selecting frequencies and perturbations at each optical communications terminal such that dithers will not interfere, or (2) compensate for the power variation that an OPA of a first optical communications terminal would experience due to dithers of an OPA of a second optical communications terminal.

In the first approach, during FD dithering, each optical communications terminal may use sets of predetermined frequencies. The set of predetermined frequencies of the first optical communications terminal may contain unique frequencies from the set of predetermined frequencies of the second optical communications terminal. In such instances, each set of predetermined frequencies may be selected such that they do not interfere with the frequencies of the other set.

FIG. 13 illustrates an example method 1300 of adjusting a plurality of phase shifters of a plurality of OPAs according to the first approach. For example, at block 1310, the method includes performing, at a first OPA of a first communications terminal, a plurality of first dithers on a first plurality of subsets of phase shifters of a plurality of phase shifters of the first OPA, wherein the plurality of first dithers are performed by applying a first set of perturbations at a first set of corresponding frequencies. As shown at block 1320, the method includes performing, at a second OPA of a second communications terminal, a plurality of second dithers on a second plurality of subsets of phase shifters of a plurality of phase shifters of the second OPA, wherein the plurality of second dithers are performed by applying a second set of perturbations at a second set of corresponding frequencies, wherein the first set of corresponding frequencies and the second set of corresponding frequencies do not interfere with one another. As shown in block 1330, the method includes adjusting, at an OPA of the first communications terminal, the plurality of subsets of phase shifters of the plurality of phase shifters based on the plurality of first dithers of the first communications terminal. And, as shown in block 1340, the method includes adjusting, at an OPA of the second communications terminal, the plurality of subsets of phase shifters of the plurality of phase shifters based on the plurality of second dithers of the second communications terminal.

Additionally or alternatively, in some instances, each of the sets of predetermined frequencies may not be unique. In such instances, perturbations of each optical communications terminal utilizing the same frequencies, or frequencies that may interfere, may be selected such that they will not interfere. For example, if two perturbations utilize the same frequency, one perturbation may be a sine function and the other may be a cosine function where one of the functions may be shifted by $\pi/2$ such that the perturbations are in phase.

In the second approach, the sets of predetermined frequencies of each may not be unique. In such an implementation, a first optical communications terminal may be configured to compensate for variation that an OPA of a second optical communications terminal would experience in an optical communications beam transmitted from an OPA of the first optical communications terminal. The variation may be due to a plurality of dithers conducted in the OPA of the first optical communications terminal. FIG. 14 illustrates an example method 1400 of adjusting a plurality of phase shifters of a first OPA. according to the third approach. For example, at block 1410 performing, at a first OPA of a first communications terminal, a plurality of dithers on a plurality of subsets of phase shifters of the plurality of phase shifters of the first OPA.

As shown in block 1420, the method includes estimating, at the first OPA of the first communications terminal, a plurality of changes of an output resulting from the plurality of dithers. In this regard, the first optical communications terminal may estimate a plurality of changes in power and/or intensity resulting from each dither conducted in the OPA of the first terminal. In some examples, the estimated change in power and/or intensity may be based on a plurality of magnitudes of perturbations associated with the plurality of dithers.

As shown in block 1430, the method includes modifying, at the first OPA of the first communications terminal, a first optical communications beam based on a plurality of estimated changes in the output. The first optical communications terminal may modify a Tx optical communications beam based on each estimated change in power and/or intensity. In this regard, the power and/or intensity of the Tx optical communications beam may be modified by each of the estimated changes in power and/or intensity. By way of example, if a first conducted dither would result in a first estimated power and/or intensity increase of 10% and a second dither would result in a second estimated power and/or intensity increase of 2%, the power and/or intensity of the Tx optical communications beam may be decreased by 12%. In another example, if a first conducted dither would result in a first estimated power and/or intensity increase of 10% and a second dither would result in a second estimated power and/or intensity decrease of 2%, the power and/or intensity of the Tx optical communications beam may be decreased by 8%. In some implementations, the Tx optical communications beam may be modified by adjusting an optical amplifier of the OPA of the first communications terminal.

Due to the modification, the plurality of dithers performed on the Tx optical communications beam of the first optical communications terminal may not be perceived when received by the second optical communications terminal. In this regard, the plurality of dithers performed by the first communications terminal may not affect Tx optical communications beams of the second optical communications terminals.

In some implementations, the second optical communication device may also perform a plurality of dithers on an optical communications beam transmitted from the OPA of the second optical communication device. The second communications terminal may perform a modification of the Tx optical communications beam in the same manner as the first communications terminal.

In some instances, an OPA may use the hybrid TD-FD mode for both Tx and Rx communications beams of differing optical communications terminals. In such instances, each terminal may perform dithers in the same manner as discussed above. In one example, each terminal may use its own unique terminal frequency. In this regard, in a system of optical communications terminals and/or client devices, each terminal or device uses a unique frequency to perform dithers. In a system with a first and second optical communications terminal, the first optical communications terminal may use a first terminal frequency and the second optical communications terminal may use a second optical communications terminal frequency. The first and second terminal frequencies may be selected such that they do not interfere. In such an example, the first and second optical communications terminal may not coordinate dithers (by synchronization, offset, etc.) as the dithers using the first terminal frequency will not interfere with the dithers using the second terminal frequency.

In another example, the terminal frequency may be an OPA frequency. In this regard, an optical communications terminal may include a plurality of OPAs, each with their own respective OPA frequency. The OPA frequency may be unique to the OPA which utilizes it. In a system with a first and second optical communications terminal, the first optical communications terminal may use a first plurality of OPA frequencies and the second optical communications terminal may use a second plurality of OPA frequencies. The first and second plurality of OPA frequencies may be selected such that they do not interfere. In such an example, the first and second optical communications terminal may not coordinate dithers (by synchronization, offset, etc.) as the dithers using the first plurality of OPA frequencies will not interfere with the dithers using the second OPA frequencies.

The features and methodology described herein provide an optical communications system, and terminals thereof, configured to correct for one or more static and/or dynamic variables such as, for example, path length mismatch, optical aberrations, atmospheric turbulence, and platform jitter. Such correction allows for reduction of the power and/or intensity of transmitted optical communications beam. Additionally, the system and terminals thereof allow for such corrections during bidirectional communication.

Moreover, to remedy the effects of more static and/or dynamic variables and increase the power and/or intensity of an optical communication beam, a wavefront sensing and control approach using dithering, or injecting some small amount of noise, at groups or subsets of plurality of phase shifters at once may be used. This may involve frequency-division (FD) mode dithering and/or time-division (TD) mode dithering. The FD and TD mode dithering may include use of an orthogonal set of functions. Additionally or alternatively, the FD and TD mode dithering approaches may include synchronized or pre-compensated dithering methods advantageous for use in bidirectional communication.

Unless otherwise stated, the foregoing alternative examples are not mutually exclusive, but may be implemented in various combinations to achieve unique advantages. As these and other variations and combinations of features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of adjusting a plurality of phase shifters of an optical phased array (OPA), the method comprising:
   identifying a plurality of subsets of phase shifters of the plurality of phase shifters based on an orthogonal set of functions;
   performing a plurality of dithers iteratively on the plurality of subsets of phase shifters of the plurality of phase shifters using the same frequency;
   determining a plurality of corrections based on a plurality of outputs of the OPA, each output resulting from each of the plurality of dithers; and
   adjusting the plurality of subsets of phase shifters of the plurality of phase shifters using the plurality of corrections, the adjustment resulting in at least one set of corrected phase shifter values.

2. The method of claim 1, wherein identifying the plurality of subsets of phase shifters of the plurality of phase shifters based on the orthogonal set of functions includes:
   identifying a first subset of phase shifters of the plurality of phase shifters based on the orthogonal set of functions; and
   identifying a second subset of phase shifters of the plurality of phase shifters based on the orthogonal set of functions.

3. The method of claim 2, wherein performing the plurality of dithers iteratively on the plurality of subsets of phase shifters of the plurality of phase shifters using the same frequency includes:
   performing a first dither on the first subset of phase shifters of the plurality of phase shifters at a first time; and
   performing a second dither on the second subset of phase shifters of the plurality of phase shifters at a second time following the first time.

4. The method of claim 3, wherein:

the first dither is performed by applying a first perturbation; and the second dither is performed by applying a second perturbation.

5. The method of claim 4, wherein the first perturbation and the second perturbations are (1) sine functions or (2) cosine functions.

6. The method of claim 5, wherein the first perturbation is a sine function and the second perturbation is a cosine function.

7. The method of claim 1, wherein determining the plurality of corrections based on the plurality of outputs of the OPA includes determining a plurality of changes in phase.

8. The method of claim 1, wherein:

the plurality of phase shifters are arranged in a circle; and the orthogonal set of functions is a set of circular functions.

9. The method of claim 1, wherein the plurality of outputs are a plurality of transmitted optical communications beams.

10. The method of claim 1, wherein the frequency is a terminal frequency unique to an optical communications terminal containing the OPA.

11. The method of claim 1, wherein the frequency is an OPA frequency unique to the OPA.

12. A system of optical communications terminals configured to transmit and receive optical communications beams, the system comprising:

a first optical communications terminal comprising:

an optical phased array (OPA) configured to transmit and receive one or more optical communications beams, the OPA comprising a plurality of phase shifters, and one or more processors configured to perform a plurality of dithers iteratively on a plurality of subsets of phase shifters of the plurality of phase shifters using a first terminal frequency; and a second optical communications terminal comprising:

an OPA configured to transmit and receive one or more optical communications beams, the OPA comprising a plurality of phase shifters, and one or more processors configured to perform a plurality of dithers iteratively on a plurality of subsets of phase shifters of the plurality of phase shifters using a second terminal frequency.

13. The system of claim 12, wherein the one or more processors of the first optical communications terminal are further configured to:

identify the plurality of subsets of phase shifters of the plurality of phase shifters based on an orthogonal set of functions;

determine a plurality of corrections based on a plurality of outputs of the OPA, each output resulting from each of the plurality of dithers; and adjust the plurality of subsets of phase shifters of the plurality of phase shifters using the plurality of corrections, the adjustment resulting in at least one set of corrected phase shifter values.

14. The system of claim 12, wherein the first terminal frequency and the second terminal frequency are unique frequencies.

15. The system of claim 12, wherein the plurality of phase shifters are arranged in a circle.

16. A method of adjusting a plurality of phase shifters of a plurality of optical phased arrays (OPA) s of a communication system, the method comprising:

performing, at a first OPA of a first optical communications terminal a first dither on a first subset of phase shifters of a plurality of phase shifters of the first OPA, wherein the first dither is performed at a first frequency;

performing, at a second OPA of a second optical communications terminal, a second dither on a second subset of phase shifters of a plurality of phase shifters of the second OPA, wherein the second dither is performed at a second frequency;

adjusting, at the first OPA of the first optical communications terminal, the first subset of phase shifters of the plurality of phase shifters based on the first dither of the first optical communications terminal; and adjusting, at the second OPA of the second optical communications terminal, the second subset of phase shifters of the plurality of phase shifters based on the second dither of the second optical communications terminal, wherein the first frequency is a first terminal frequency and the second frequency is a second terminal frequency.

17. The method of claim 16, wherein the first frequency and the second frequency do not interfere.

18. The method of claim 16, wherein the first dither and second dither are not coordinated.

19. The method of claim 16, wherein performing, at the first OPA of the first optical communications terminal, the first dither on the first subset of phase shifters of the plurality of phase shifters of the first OPA includes:

applying, at the first OPA of the first optical communications terminal, a first perturbation at the first frequency to a wavefront at the first subset of the phase shifters; and adjusting, at the first OPA of the first optical communications terminal, an initial set of phase shifter values of the first subset of phase shifters based on the first perturbation, the adjustment resulting in a first set of phase shifter values.

20. The method of claim 19, further comprising:

determining, at the first OPA of the first optical communications terminal, a first correction based on a first power output of the first OPA resulting from the first dither;

wherein adjusting, at the first OPA of the first optical communications terminal, the first subset of phase shifters of the plurality of phase shifters is based on the first correction.

* * * * *